United States Patent
Ryu et al.

(10) Patent No.: US 11,570,796 B2
(45) Date of Patent: Jan. 31, 2023

(54) TRIGGERING REFERENCE SIGNALS IN WIRELESS NETWORKS

(71) Applicant: QUALCOMM Incorporated, San Diego, CA (US)

(72) Inventors: Jung Ho Ryu, Fort Lee, NJ (US); Tao Luo, San Diego, CA (US); Yan Zhou, San Diego, CA (US); Kiran Venugopal, Raritan, NJ (US); Tianyang Bai, Somerville, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/009,607

(22) Filed: Sep. 1, 2020

(65) Prior Publication Data

US 2021/0068129 A1 Mar. 4, 2021

Related U.S. Application Data

(60) Provisional application No. 62/895,832, filed on Sep. 4, 2019.

(51) Int. Cl.
  *H04W 72/04* (2009.01)
  *H04W 72/12* (2009.01)
  (Continued)

(52) U.S. Cl.
  CPC ....... *H04W 72/1263* (2013.01); *H04L 5/0051* (2013.01); *H04L 5/0055* (2013.01); *H04W 56/001* (2013.01); *H04W 80/02* (2013.01)

(58) Field of Classification Search
  CPC .......... H04W 72/1263; H04W 56/001; H04W 80/02; H04L 5/0051; H04L 5/0055;
  (Continued)

(56) References Cited

U.S. PATENT DOCUMENTS

2018/0160420 A1  6/2018  Kim et al.
2019/0090227 A1* 3/2019  Tsai ................ H04W 56/0015
(Continued)

FOREIGN PATENT DOCUMENTS

EP    3461025 A1    3/2019
WO    2020113999   6/2020
(Continued)

OTHER PUBLICATIONS

Vivo, R1-1908180, Efficient Scell activation, 3GPP TSG RAN WG1 #98, Aug. 26-30, 2019 (Year: 2019).*
Apple: et al., "Enhancement on SCell Activation and Deactivation", 3GPP Draft, R2-1908278, 3GPP TSG-RAN WG2 Meeting #106, Enhancement on SCell Activation and Deactivation, 3rd Generation
(Continued)

*Primary Examiner* — Mahbubul Bar Chowdhury
(74) *Attorney, Agent, or Firm* — Qualcomm Incorporated

(57) ABSTRACT

Aspects provide a mechanism for activating a secondary serving cell (SCell) in a wireless communication network supporting a multi-cell transmission environment. In some examples, a scheduled entity (e.g., a UE) in a connected mode with a primary serving cell (PCell) may synchronize with the SCell to activate the SCell for multi-cell communication with the PCell and the SCell. To enable synchronization with the SCell, the PCell may trigger communication and processing of one or more reference signals between the scheduled entity and the SCell.

23 Claims, 18 Drawing Sheets

(51) Int. Cl.
  *H04W 56/00* (2009.01)
  *H04L 5/00* (2006.01)
  *H04W 80/02* (2009.01)
(58) Field of Classification Search
  CPC ..... H04L 5/001; H04L 5/0098; H04L 5/0048; H04L 5/0035
  See application file for complete search history.

(56) References Cited

U.S. PATENT DOCUMENTS

| | | | | |
|---|---|---|---|---|
| 2019/0150161 | A1* | 5/2019 | Cheng | H04L 5/0048 370/330 |
| 2019/0363843 | A1 | 11/2019 | Gordaychik | |
| 2021/0329546 | A1* | 10/2021 | Wang | H04W 72/04 |
| 2021/0337619 | A1* | 10/2021 | Zhang | H04W 80/02 |

FOREIGN PATENT DOCUMENTS

| | | | | |
|---|---|---|---|---|
| WO | 2020164115 | A1 | 8/2020 | |
| WO | WO-2021003678 | A1 * | 1/2021 | H04L 5/005 |

OTHER PUBLICATIONS

Partnership Project (3GPP), Mobile Competence Centre, 650, Route Des Lucioles, F-06921 Sophia-Antipolis Cedex, vol. RAN WG2, No. Reno, USA, May 13, 2019-May 17, 2019, May 18, 2019 (May 18, 2019), XP051740422, 4 Pages, Retrieved from the Internet: URL: http://www.3gpp.org/ftp/tsg%5Fran/WG2%5FRL2/TSGR2%5F106/Docs/R2%2D1908278%2Ezip. [retrieved on May 18, 2019] the whole document.

International Search Report and Written Opinion—PCT/US2020/049033—ISA/EPO—dated Jan. 26, 2021.

Mti, et al., "Discussion on Beam Information Indication for CA and DC", 3GPP Draft, R1-1720562, 3GPP TSG RAN WG1 Meeting 91, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 17, 2017 (Nov. 17, 2017), XP051369038, 6 Pages, Retrieved from the Internet: URL: http://www.3gpp.org/ftp/tsg%5Fran/WG1%5FRL1/TSGR1%5F91/Docs/. [retrieved on Nov. 17, 2017] the whole document.

* cited by examiner

TRIGGERING REFERENCE SIGNALS IN WIRELESS NETWORKS

CROSS-REFERENCE TO RELATED APPLICATIONS

The present application for patent claims priority to and the benefit of U.S. Provisional Application No. 62/895,832, titled "TRIGGERING REFERENCE SIGNALS IN WIRELESS NETWORKS" filed Sep. 4, 2019, and assigned to the assignee hereof and hereby expressly incorporated by reference herein as if fully set forth below in its entirety and for all applicable purposes.

TECHNICAL FIELD

The technology discussed below relates generally to wireless communication systems, and more particularly, to multi-cell configurations in wireless communication systems.

INTRODUCTION

Wireless communication networks may utilize a coordinated multi-point (CoMP) network configuration in which transmissions from multiple transmission points (TRPs) may be simultaneously directed towards a UE. In a multi-TRP transmission scheme, multiple TRPs may or may not be co-located and may or may not be within a same cell. Each of the multiple TRPs may transmit the same or different data to a user equipment (UE). When transmitting different data from the multiple TRPs, a higher throughput may be achieved. When transmitting the same data (with potentially different redundancy versions) from the multiple TRPs, transmission reliability may be improved.

In some examples, each TRP may utilize the same carrier frequency to communicate with a UE. In other examples, each TRP may utilize a different carrier frequency (referred to as a component carrier) and carrier aggregation may be performed at the UE. In this example, the multi-TRP transmission scheme may be referred to as a multi-carrier or multi-cell transmission scheme. In a multi-carrier or multi-cell transmission scheme, there are a number of serving cells, each utilizing a different component carrier for communication with the UE. One of the serving cells may be referred to as a Primary serving cell (PCell), while the other serving cells may be referred to as Secondary serving cells (SCells). The PCell maintains the primary connection with the UE and is responsible for the radio resource control (RRC) connection setup.

Multi-cell transmission schemes may be implemented across different radio access technologies (RATs), such as 5G New Radio (NR) or Long Term Evolution (LTE). In such multi-RAT-dual connectivity (MR-DC) configurations, the PCell may be associated with a first RAT (e.g., 5G-NR or LTE), while the SCell may be associated with a second RAT (e.g., 5G-NR or LTE). Enhancements in multi-cell environments continue to be made to improve the user experience.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

In one example, a method for a user equipment (UE) to communicate in a wireless communication network including a primary serving cell (PCell) and a secondary serving cell (SCell) is disclosed. The method can include receiving a reference signal trigger from the PCell triggering communication and processing of one or more reference signals between the UE and the SCell, and synchronizing with the SCell based on the one or more reference signals to activate the SCell for multi-cell communication.

Another example provides a scheduled entity in a wireless communication network including a primary serving cell (PCell) and a secondary serving cell (SCell). The scheduled entity includes a transceiver, a memory, and a processor communicatively coupled to the transceiver and the memory. The processor and the memory can be configured to receive a reference signal trigger from the PCell triggering communication and processing of one or more reference signals between the UE and the SCell, and synchronize with the SCell based on the one or more reference signals to activate the SCell for multi-cell communication.

In another example, a method for a primary serving cell (PCell) to facilitate multi-cell communication in a wireless communication network including the PCell and a secondary serving cell (SCell) is disclosed. The method can include communicating with a user equipment (UE) in the PCell, activating communication between the UE and the SCell for the multi-cell communication, and transmitting a reference signal trigger to the UE that triggers communication and processing of one or more reference signals between the UE and the SCell to enable the UE to synchronize with the SCell.

In another example, a method for a secondary serving cell (SCell) to facilitate multi-cell communication in a wireless communication network including a primary serving cell (PCell) and the SCell. The method can include configuring a plurality of reference signals in the SCell, receiving a reference signal message from the PCell including an indication of one or more reference signals of the plurality of reference signals selected by the PCell for a user equipment (UE) to utilize to synchronize with the SCell, and communicating the one or more reference signals with the UE to enable the UE to synchronize with the SCell and activate the SCell for the multi-cell communication.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
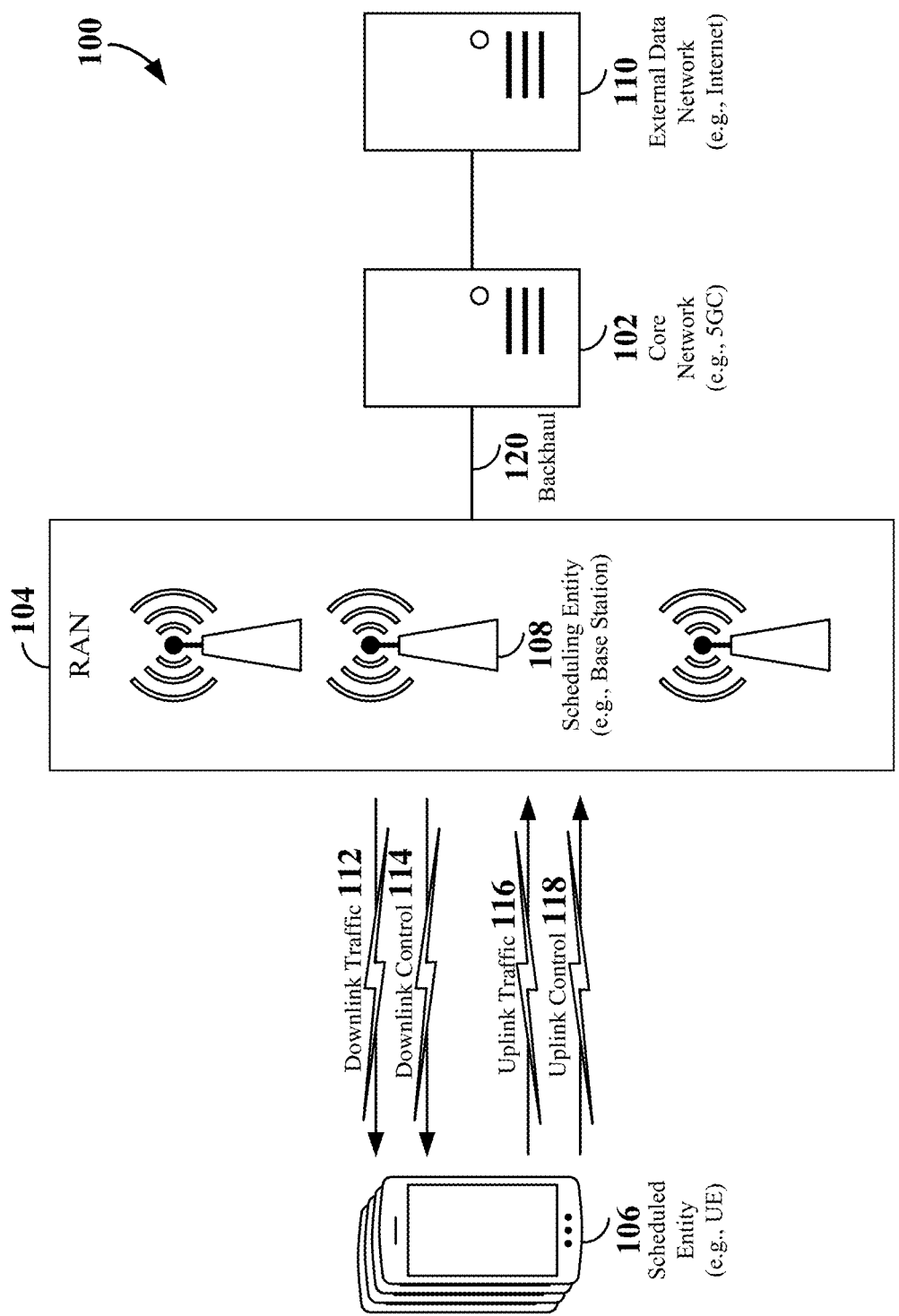
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to mechanisms for activating a secondary serving cell (SCell) in a wireless communication network supporting a multi-cell transmission environment. In some examples, a scheduled entity (e.g., a UE) in a connected mode with a primary serving cell (PCell) may synchronize with an SCell to activate the SCell for multi-cell communication with the PCell and the SCell. To enable synchronization with the SCell, one or more reference signals may be communicated between the scheduled entity and the SCell for on-demand processing thereof. For example, the PCell may trigger communication and processing of the one or more reference signals between the scheduled entity and the SCell upon determining to activate communication between the scheduled entity and the SCell. In some examples, the PCell may utilize a first radio access technology (RAT), while the SCell utilizes a second RAT.

In some examples, the PCell may transmit a reference signal trigger to the scheduled entity identifying the one or more reference signals to be communicated with the SCell. The reference signal trigger may be included, for example, within a medium access control-control element (MAC-CE). In addition, the PCell may further transmit an indication of the one or more reference signals identified in the reference signal trigger to the SCell via, for example, backhaul signaling. Examples of reference signals may include, but are not limited to, a channel state information-reference signal (CSI-RS), a synchronization signal block (SSB), or a sounding reference signal (SRS).

In some examples, each of the reference signals may be pre-configured with the same or different transmission configuration index (TCI) states (e.g., for downlink reference signals) or spatial relation indicators (SRIs) (e.g., for uplink reference signals). For example, each of the reference signals may be communicated on the same or different beams. In some examples, one or more of the downlink reference signals may be transmitted from a different transmission reception point (TRP). In this example, the TCI state may include the TRP identity or cell identity.

In some examples, the scheduled entity may transmit acknowledgement information acknowledging receipt of the MAC-CE to the SCell. In examples in which the downlink reference signals are communicated with different TCI states (e.g., via different beams), the scheduled entity may transmit the acknowledgement information in a beam sweeping manner across one or more of the beams utilized for the reference signals. For example, the scheduled entity may receive a reference signal and transmit acknowledgement information on the uplink beam that corresponds to the spatial direction of the downlink beam of the received downlink reference signal. In some examples, the SCell may select a serving beam pair link (BPL) for the scheduled entity based on the different received beams carrying the acknowledgement information. The SCell may further provide the received acknowledgement information to the PCell via, for example, backhaul links.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical (wireline) connection, a wireless connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
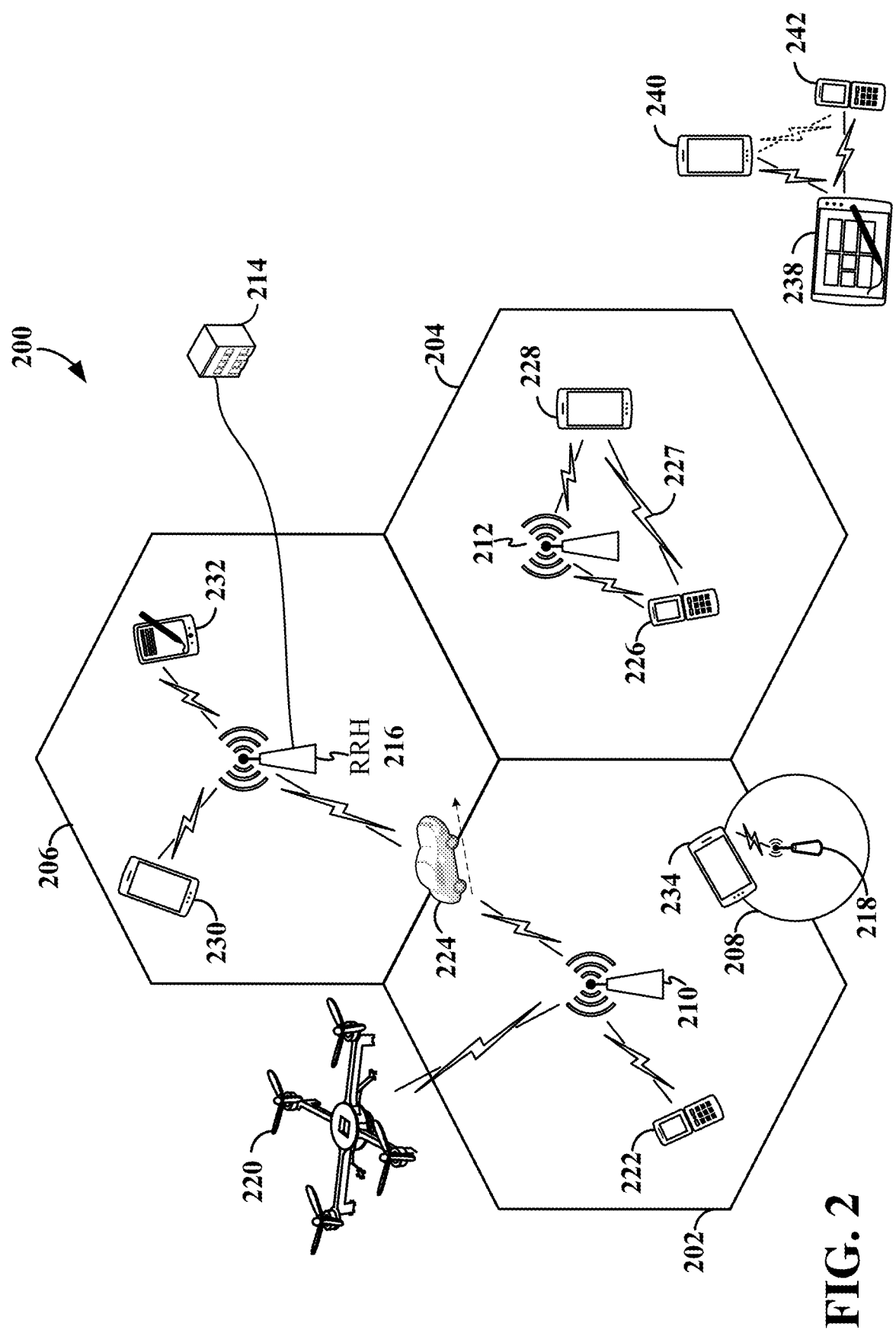
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing OFDM with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), OFDM, sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still expected to access unlicensed spectrum, generally, any operator or device may gain access. Shared spectrum may fall between licensed and unlicensed spectrum, wherein technical rules or limitations may be used to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, 5G networks (e.g., RAN 200) may further support carrier aggregation of a primary serving cell (PCell) and one or more secondary serving cells (SCells). Each of the PCell and SCells may transmit the same or different data to a UE. In addition, the PCell and each of the SCells may utilize a different carrier frequency (referred to as a component carrier) and carrier aggregation may be performed at the UE. The PCell maintains the primary connection with the UE and is responsible for the radio resource control (RRC) connection setup. In addition, physical uplink control channel (PUCCH) transmissions from the UE to the base station occur on the PCell.

In 5G-NR, carrier aggregation can utilize component carriers in the same band or different bands. In some examples, the carriers may include licensed bands (e.g., 5G, 4G using various licensed bands) and unlicensed bands (e.g., Wi-Fi, using industrial, scientific, and medical (ISM) bands and Unlicensed National Information Infrastructure (U-NII) bands). In some examples, a single radio resource control (RRC) layer can configure carrier aggregation using sub-6 GHz carriers and above-6 GHz carriers such as millimeter wave (mmWave) carriers. For example, the PCell or anchor cell may configure carrier aggregation to offload data traffic to one or more component carriers, each of which corresponds to an SCell. In some examples, the PCell may use sub-6 GHz carriers, and the SCells may use above-6 GHz carriers (e.g., mmW carriers).

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
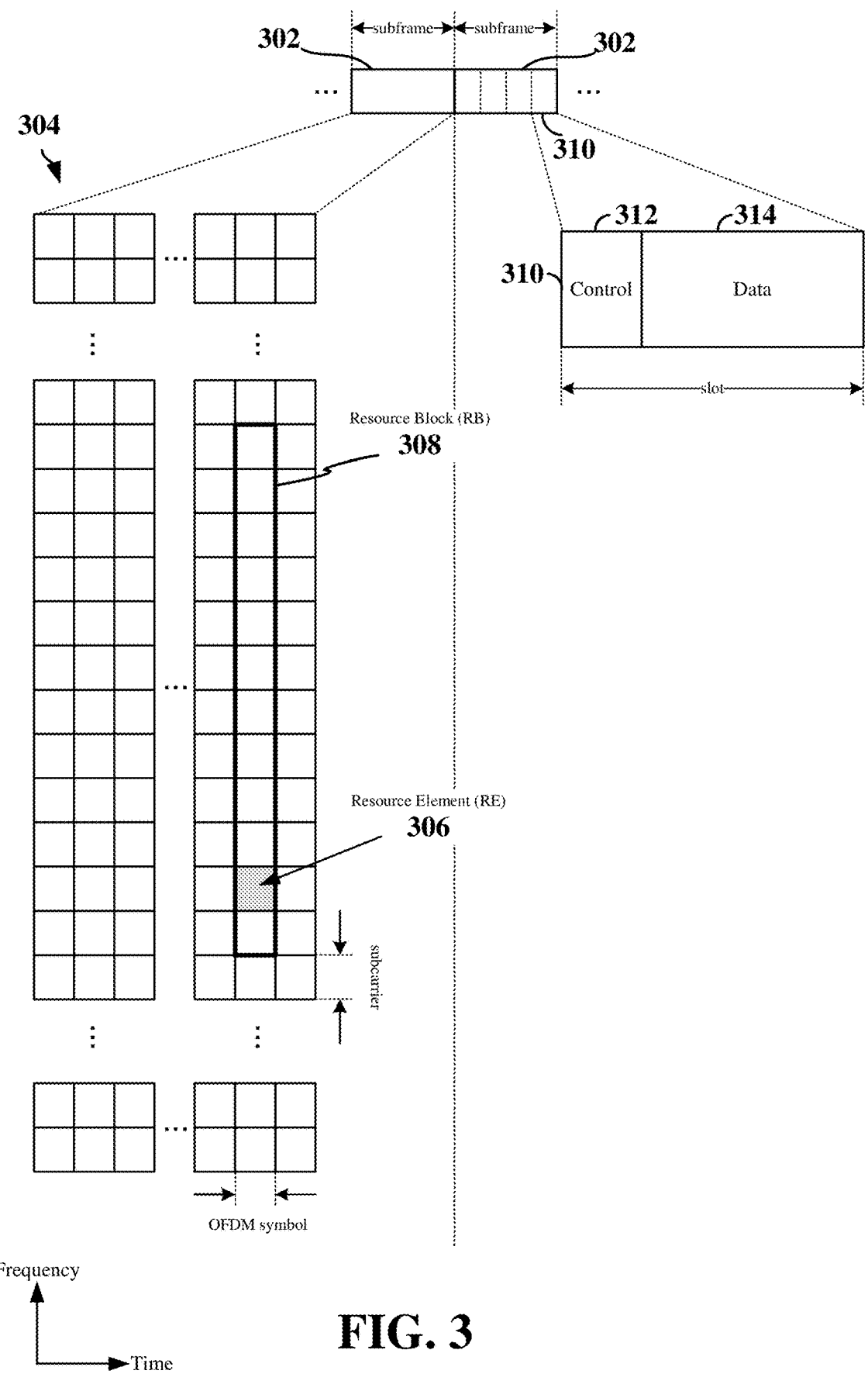
FIG. 3 is a schematic illustration of an organization of wireless resources in an air interface utilizing orthogonal frequency divisional multiplexing (OFDM) according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs (scheduled entities) for downlink or uplink transmissions typically involves scheduling one or more resource elements 306 within one or more sub-bands or bandwidth parts (BWPs). Thus, a UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), channel state information-reference signal (CSI-RS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the base station may allocate one or more REs 306 (e.g., within a control region 312) to carry DL control information including one or more DL control channels, such as a physical hybrid automatic repeat request (HARQ) indicator channel (PHICH), a physical downlink control channel (PDCCH), etc., to one or more scheduled entities. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 to carry other DL signals, such as a DMRS; a phase-tracking reference signal (PT-RS); a CSI-RS; a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, a list of common search spaces, a paging search space, downlink configuration information, and uplink configuration information. The MIB and SIB1 together provide the minimum system information (SI) for initial access.

In an UL transmission, the UE may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry SIBs (e.g., SIB1), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
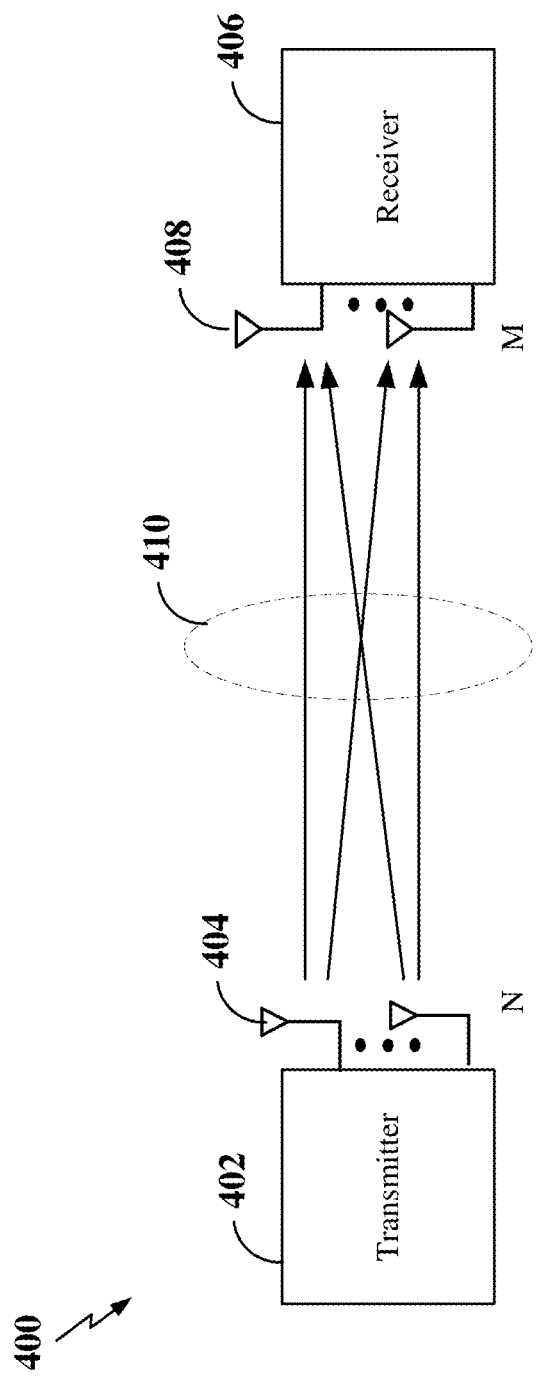
FIG. 4 is a block diagram illustrating a wireless communication system supporting multiple-input multiple-output (MIMO) communication according to some aspects.

In some examples, the scheduling entity and/or scheduled entity may be configured for beamforming and/or multiple-input multiple-output (MIMO) technology. FIG. 4 illustrates an example of a wireless communication system 400 supporting MIMO technology. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduled entity, a scheduling entity or other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G-NR systems, particularly for above 6 GHz or mmWave systems, beamformed signals may be utilized for most downlink channels, including the physical downlink control channel (PDCCH) and physical downlink shared channel (PDSCH). In addition, broadcast control information, such as the master system information block (MSIB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

Figure 5:
FIG. 5 is a diagram illustrating beamforming in a wireless communication system.

FIG. 5 is a diagram illustrating communication between a base station (BS) 504, such as a gNB, and a UE 502 using beamformed signals according to some aspects of the disclosure. The base station 504 may be any of the base stations or scheduling entities illustrated in FIGS. 1 and/or 2, and the UE 502 may be any of the UEs or scheduled entities illustrated in FIGS. 1 and/or 2.

In the example shown in FIG. 5, the base station 504 is configured to generate a plurality of beams 506a-506h, each associated with a different beam direction. In addition, the UE 502 is configured to generate a plurality of beams 508a-508e, each associated with a different beam direction. The base station 504 and UE 502 may select one or more beams 506a-506h on the base station 504 and one or more beams 508a-508e on the UE 502 for communication of uplink and downlink signals therebetween.

In an example, the base station 504 may be configured to sweep or transmit on each of a plurality of downlink beams 506a-506h during one or more synchronization slots. For example, the base station 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink beams 506a-506h transmitted during a same symbol may not be adjacent to one another. In some examples, the base station 504 may transmit more or less beams distributed in all directions (e.g., 360 degrees).

In addition, the UE 502 is configured to receive the downlink beam reference signals on a plurality of uplink beams 508a-508e. In some examples, the UE 502 searches for and identifies each of the downlink beams 506a-506h based on the beam reference signals. The UE 502 then performs beam measurements (e.g., reference signal received power (RSRP), SINR, reference signal received quality (RSRQ), etc.) on the beam reference signals to determine the respective beam quality of each of the downlink beams 506a-506h as measured on each of the uplink beams 508a-508e.

The UE 502 may then transmit a beam measurement report (e.g., a Layer 1 (L1) measurement report) including the respective beam identifier (e.g., beam index) and beam measurement (e.g., RSRP) of one or more of the downlink beams 506a-506h to the base station 504. The base station 504 may then select one or more downlink beams on which to transmit unicast downlink control information and/or user data traffic to the UE 502. In some examples, the selected downlink beam(s) have the highest gain from the L1 measurement report. In some examples, the UE 502 can further identify the downlink beams selected by the base station from the beam measurements. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 504 or the UE 502 may further select a corresponding uplink beam on the UE 502 for each selected serving downlink beam to form a respective downlink beam pair link (BPL) for each selected serving downlink beam. For example, the UE 502 can utilize the beam measurements to select the corresponding uplink beam for each serving downlink beam. In some examples, the selected uplink beam to pair with a particular downlink beam may have the highest gain for that particular downlink beam.

In other examples, when the channel is reciprocal (e.g., the downlink and uplink channel qualities are the same), the base station 504 may derive a downlink beam. Derivation of the downlink beam can be based on uplink measurements performed by the base station 504, such as by measuring the received power, quality, or other variable on the plurality of base station beams 506a-506h of a sounding reference signal (SRS) or other uplink reference signal transmitted by the wireless communication device 502 on one or more of the uplink beams 508a-508e. In some examples, the base station 504 may derive the downlink beam based on a combination of the L1 measurement report and uplink measurements.

Figure 6:
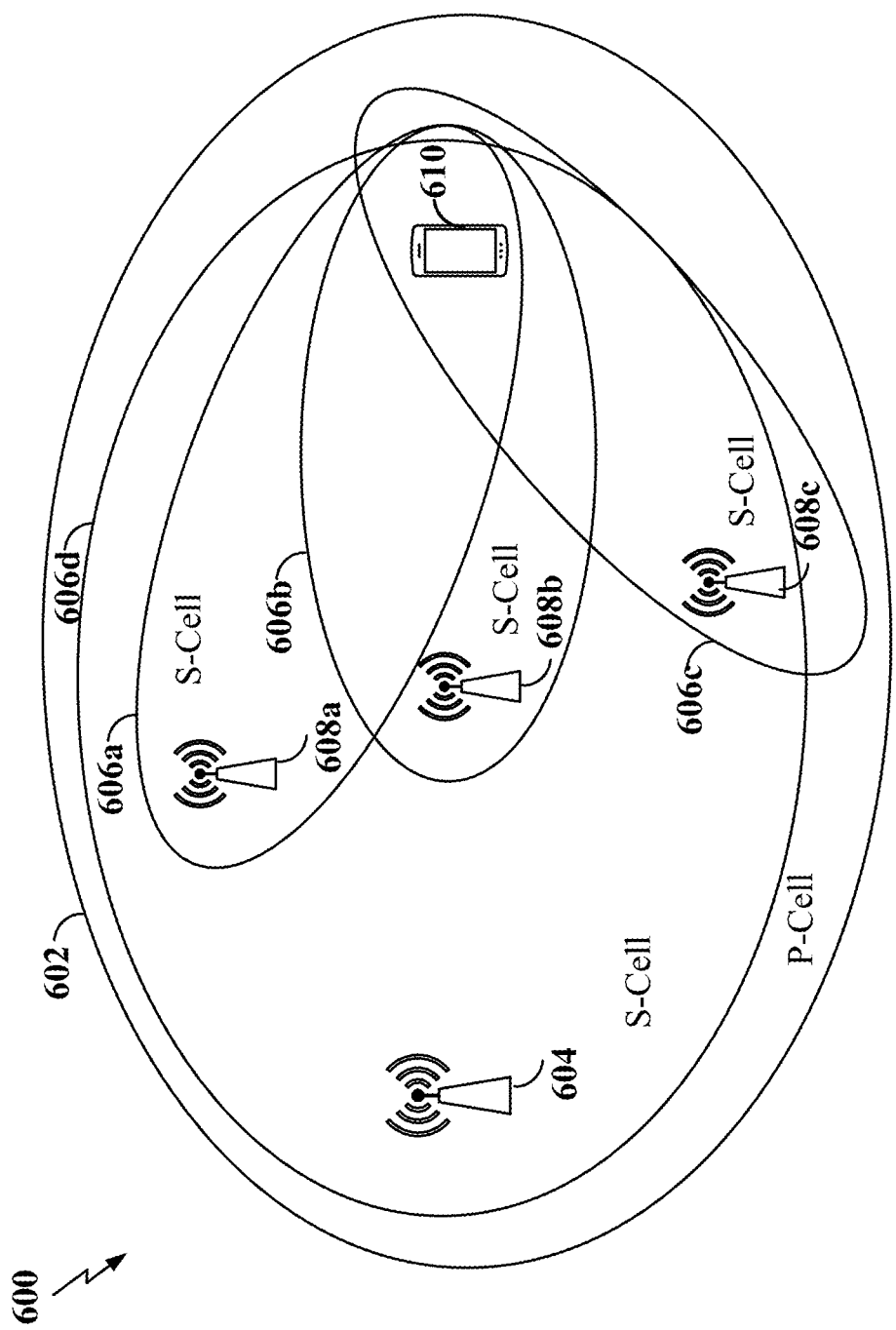
FIG. 6 is a diagram illustrating a multi-cell transmission environment according to some aspects.

In addition to MIMO and beamforming techniques, 5G-NR networks may further support carrier aggregation of component carriers transmitted from different transmission and reception points (TRPs) in a multi-cell transmission environment. An example of a multi-cell transmission environment 600 is shown in FIG. 6. The multi-cell transmission environment 600 includes a primary serving cell (PCell) 602 and one or more secondary serving cells (SCells) 606a, 606b, 606c, and 606d. The PCell 602 may be referred to as the anchor cell that provides a radio resource control (RRC) connection to the UE. In some examples, the PCell and one or more of the SCells may be co-located (e.g., different transmission reception point (TRPs) may be at the same location).

When carrier aggregation is configured, one or more of the SCells 606a-606d may be activated or added to the PCell 602 to form the serving cells serving a user equipment (UE) 610. Each serving cell corresponds to a component carrier (CC). The CC of the PCell 602 may be referred to as a primary CC, and the CC of a SCell 606a-606d may be referred to as a secondary CC. The PCell 602 and one or more of the SCells 606 may be served by a respective TRP 604 and 608a-608c. Each TRP 604 and 608a-608c may be a base station (e.g., gNB), remote radio head of a gNB, or other scheduling entity similar to those illustrated in any of FIGS. 1, 2, 4, and 5. In some examples, a base station (e.g., base station 504) may include multiple TRPs, each corresponding to one of a plurality of co-located antenna arrays, each supporting a different carrier. In the example shown in FIG. 6, SCells 606a-606c are each served by a respective base station 608a-608c. In addition, SCell 606d and PCell 602 are co-located and served by a single base station 604. The coverage of the PCell 602 and SCell 606d may differ since component carriers in different frequency bands may experience different path loss.

The PCell 602 may add or remove one or more of the SCells 606a-606d to improve reliability of the connection to the UE 610 and/or increase the data rate. However, the PCell 602 may only be changed upon a handover to another PCell.

In some examples, the PCell 602 may utilize a first radio access technology (RAT), such as LTE, while one or more of the SCells 606 may utilize a second RAT, such as 5G-NR. In this example, the multi-cell transmission environment may be referred to as a multi-RAT-dual connectivity (MR-DC) environment. In some examples, the PCell 602 may be a low band cell, and the SCells 606 may be high band cells. A low band (LB) cell uses a CC in a frequency band lower than that of the high band cells. For example, the high band cells may use mmWave CC, and the low band cell may use a CC in a band (e.g., sub-6 GHz band) lower than mmWave. In general, a cell using a mmWave CC can provide greater bandwidth than a cell using a low band CC. In addition, when using above-6 GHz frequency (e.g., mmWave) carriers, beamforming may be used to transmit and receive signals.

The PCell 602 is responsible not only for connection setup, but also for radio resource management (RRM) and radio link monitoring (RLM) of the connection with the UE 610. For example, the PCell 602 may activate one or more of the SCells (e.g., SCell 606a) for multi-cell communication with the UE 610. In some examples, the PCell may activate the SCell 606a on an as-needed basis instead of maintaining the SCell activation when the SCell 606a is not utilized for data transmission/reception in order to reduce power consumption by the UE 610. However, there is a delay involved in activating the SCell 606a, primarily as a result of the time involved in time/frequency synchronization between the UE 610 and the SCell 606a. For example, in order for the UE 610 to synchronize with the SCell 606a, the UE 610 and/or SCell 606a may measure or otherwise utilize one or more reference signals communicated between the UE 610 and the SCell 606a. Examples of reference signals may include, but are not limited to, aperiodic or semi-persistent downlink CSI-RSs, downlink synchronization signal blocks (SSBs), and/or uplink SRSs.

In some examples, to minimize the time involved in synchronizing with the SCell 606a during SCell activation, the SCell 606a may continuously transmit reference signals with high periodicity. However, this may increase the overhead in the SCell 606a. In various aspects of the disclosure, the PCell 602 may trigger communication of one or more reference signals between the UE 610 and the SCell 606a on-demand to enable the UE 610 to synchronize with the SCell 606a with reduced time, while also minimizing the overhead in the SCell 606a.

Figure 7:
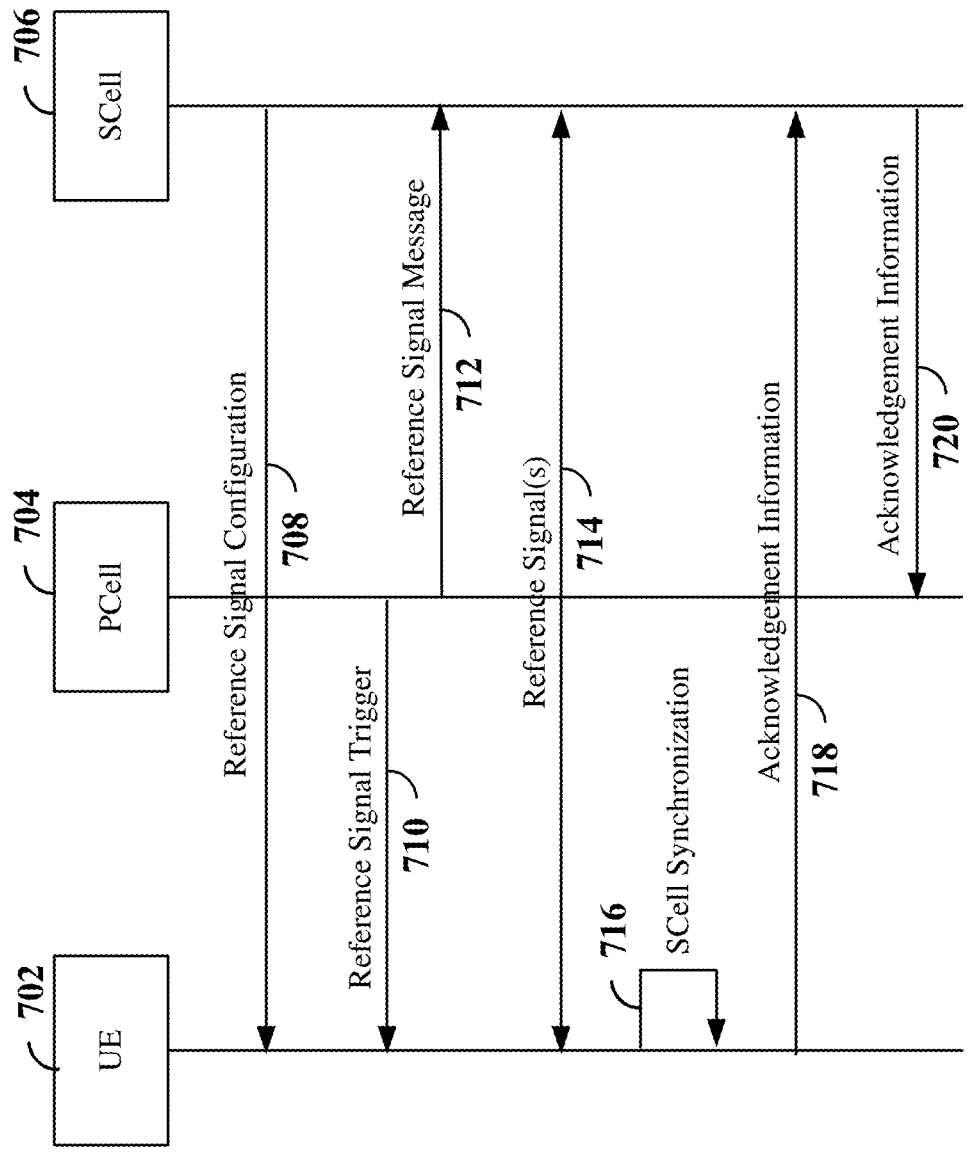
FIG. 7 is a diagram illustrating exemplary signaling to activate communication with a secondary serving cell (SCell) in a multi-cell transmission environment according to some aspects.

FIG. 7 is a diagram illustrating exemplary signaling to activate communication with an SCell 706 in a multi-cell transmission environment. In the example shown in FIG. 7, a UE 702 is in connected mode with a PCell 704. Each of the PCell 704 and SCell 706 is served by a respective scheduling entity (e.g., a base station). The scheduling entities may be any of the base stations or other scheduling entities illustrated in FIGS. 1, 2, 5, and 6 and the UE 702 may be any of the UEs or scheduled entities illustrated in FIGS. 1, 2, 5 and 6.

In 5G-NR, control and data may be communicated between the UE 702 and each of the PCell 704 and SCell 706 over a plurality of different beams/paths, each having a different spatial relationship with other beams/paths, via one or more TRPs. At 708, the SCell 706 may pre-configure each of the reference signals to be communicated between the UE 702 and the SCell 706 during activation of the SCell 706. For example, the SCell 706 may pre-configure each of the reference signals with particular time—frequency resources and particular beams/paths and provide configuration information for each of the reference signals to the UE 702 via, for example, RRC signaling during the UE initial access procedure with the SCell 706.

In some examples, the configuration information may include a transmission configuration indicator (TCI) state (e.g., for downlink reference signals) or spatial relation indicator (SRI) (e.g., for uplink reference signals) that indicates quasi co-located (QCL) information (e.g., QCL Type and time-frequency resources) of the reference signal. Examples of QCL types may include one or more of Doppler shift, Doppler spread, average delay, delay spread, and a spatial RX parameter (e.g., spatial beam). In some examples, each of the reference signals may be pre-configured with the same or different TCI states (e.g., for downlink reference signals) or SRIs (e.g., for uplink reference signals) with respect to the spatial beams or BPLs on which the reference signals are transmitted. Thus, each of the reference signals may be communicated on the same or different beams or BPLs. In addition, one or more of the downlink reference signals may be transmitted from a different transmission reception point (TRP) associated with the SCell or associated with another cell co-located with a TRP of the SCell. In this example, the TCI state may include the TRP identity (ID) or equivalent cell ID.

At 710, the PCell 704 may determine to activate the SCell 706 for multi-cell communication and transmit a reference signal trigger to the UE 702 identifying one or more of the reference signals to be communicated with the SCell 706. For example, the PCell 704 may receive an activation message from the UE 702 to activate communication with the SCell 706. As another example, the PCell 704 may decide to activate communication between the UE 702 and the SCell 706 to provide a higher data rate to the UE 702. In some examples, the PCell 704 may select one or more of the reference signals pre-configured by the SCell 706 for use in activating the SCell 706 and transmit an identifier of each of the selected reference signals in the reference signal trigger. The reference signal trigger may be included, for example, within a medium access control-control element (MAC-CE) of a physical downlink control channel (PDCCH). At 712, the PCell 704 may further transmit a reference signal message including an indication of the one or more reference signals identified in the reference signal trigger to the SCell 706 via, for example, backhaul signaling via a wireline or wireless connection.

At 714, the one or more reference signals identified in the reference signal trigger may be communicated between the UE 702 and SCell 706. Examples of reference signals may include aperiodic or semi-persistent CSI-RSs, synchronization signal blocks (SSBs), and/or uplink SRSs. For example, the SCell 706 may schedule resources for the transmission of aperiodic downlink reference signals (e.g., CSI-RS) based on the respective TCI states or utilize semi-persistently scheduled resources to transmit downlink reference signals (e.g., CSI-RS) based on the respective TCI states. The SCell 706 may further transmit an SSB according to the periodicity set for the SSB in the SCell. In addition, the SCell 706 may receive an uplink sounding reference signal (SRS) from the UE 702 on pre-configured (e.g., semi-persistently scheduled) uplink resources. For example, the SCell 706 may receive the SRS based on the SRIs (e.g., beam or beams) defined for the SRS. In some examples, each of the reference signals may be communicated with the same TCI state or SRI (e.g., on a same beam or BPL). In other examples, one or more of the reference signals may be communicated with different TCI states or SRIs (e.g., via different beams or BPLs). In addition, one or more of the reference signals may be repeated in a beam sweeping manner across a plurality of beams.

At 716, the UE 702 may synchronize with the SCell 706 utilizing the one or more reference signals. For example, the UE 702 may utilize the SSB for time/frequency synchronization with the SCell 706 and to derive frame information in the SCell 706. The UE 702 may further measure the CSI-RS for time/frequency tracking. In some examples, the UE 702 may further provide channel state feedback (CSF) to the SCell 706 based on the CSI-RS measurements to enable the SCell 706 to select a modulation and coding scheme (MCS) to utilize for downlink communication with the UE 702. On the uplink, the SCell 706 may measure the SRS transmitted by the UE 702 to obtain the channel state information and to further enable the UE to synchronize with the SCell 706. For example, the SRS may be transmitted on multiple beams and the SCell 706 may measure the SRS on each of the received beams to acquire time and frequency synchronization for the UE 702. The SCell 706 may then transmit time/frequency synchronization information to the UE 702 to enable the UE 702 to synchronize with the SCell 706.

At 718, the UE 702 may transmit acknowledgement information acknowledging receipt of the MAC-CE including the reference signal trigger to the SCell 706. For example, the acknowledgement information may include an ACK or NACK and the timing of ACK/NACK transmission may be defined based on the transmission timing of the triggered reference signals. In addition, the ACK/NACK spatial relationship may be linked to the TCI states of the triggered reference signals. In examples in which the reference signals are communicated with different TCI states (e.g., via different beams), the UE 702 may transmit the acknowledgement information in a beam sweeping manner across one or more of the beams utilized for the reference signals. In some examples, the UE may transmit the ACK/NACK for the MAC-CE within a beam-swept physical uplink control channel (PUCCH) with a one-to-one mapping between the PUCCH beams and the TCI states (e.g., downlink beam spatial direction) of each of the triggered reference signals. In this example, the ACK/NACK is transmitted on each of the beams corresponding to each of the reference signals triggered by the MAC-CE.

In other examples, the UE 702 may select a subset of the triggered reference signals to measure (e.g., to utilize for synchronization) and transmit the ACK/NACK for the MAC-CE within a beam-swept PUCCH with a one-to-one mapping between the PUCCH beams and the TCI states (e.g., spatial directions) of the subset of triggered reference signals. In this example, the subset of triggered reference signals may be selected by the UE 702 based on one or more metrics. For example, the UE 702 may select the subset of triggered reference signals based on the TCI states (e.g., beams) utilized for transmission of each of the triggered reference signals.

In some examples, the SCell 706 may select a serving beam pair link (BPL) for the UE 702 based on the different receive beams carrying the acknowledgement information. For example, the SCell 706 may measure the signal-to-interference-plus-noise ratio (SINR) on each of the ACK/NACK beams to identify the serving BPL for the UE 702.

In examples in which the UE 702 transmits an uplink SRS to the SCell (e.g., at 714), at 716/718, instead of the UE 702 transmitting an ACK/NACK, the SCell 706 may transmit an ACK/NACK to the UE 702 on each of the downlink beams corresponding to the SRIs of the SRS (e.g., each of the downlink beams having a same spatial direction as the uplink beams utilized to transmit the SRS). In this example, the ACK/NACK may further include the time/frequency synchronization information to enable the UE 702 to synchronize with the SCell 706. The ACK/NACK indicates the acknowledgement information for the MAC-CE by acknowledging receipt of the SRS based on the MAC-CE SRS trigger.

At 720, the SCell 706 may further provide the acknowledgement information (ACK/NACK) to the PCell 704 via, for example, backhaul links. In examples in which the ACK/NACK is received from the UE 702 (e.g., at 718), the SCell 706 may forward the ACK/NACK to the PCell 704. In examples in which the ACK/NACK is transmitted from the SCell 706 to the UE 702 (e.g., in response to an SRS), the SCell 706 may further transmit the ACK/NACK to the PCell 704.

Figure 8:
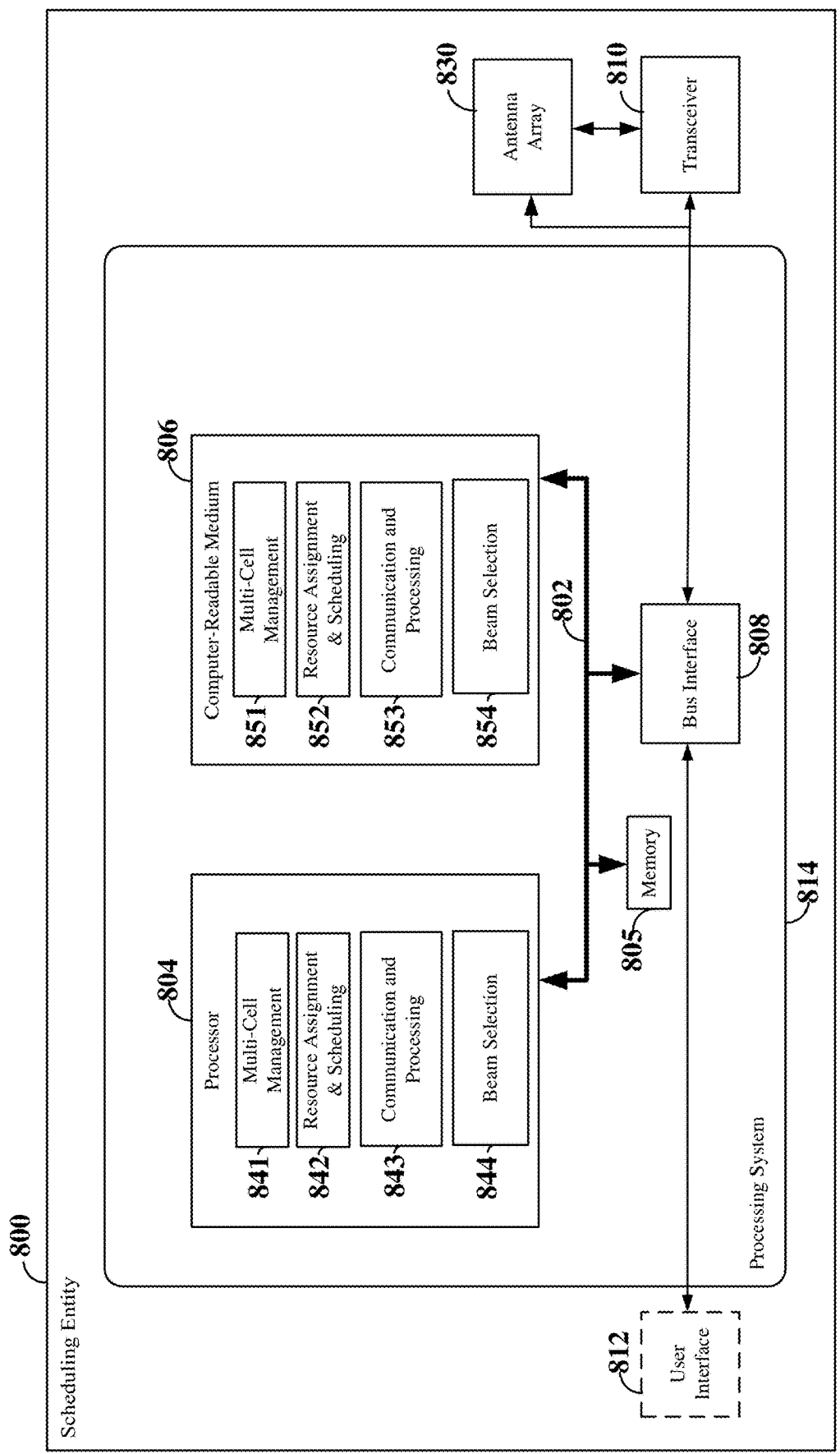
FIG. 8 is a block diagram illustrating an example of a hardware implementation for a scheduling entity employing a processing system according to some aspects.

FIG. 8 is a conceptual diagram illustrating an example of a hardware implementation for an exemplary scheduling entity 800 employing a processing system 814. For example, the scheduling entity 800 may be a base station as illustrated in any one or more of FIGS. 1, 2, and 5-7. In some examples, the scheduling entity 800 may be serving a PCell or an SCell for multi-cell communication with a UE.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes described below. The processor 804 may in some instances be implemented via a baseband or modem chip and in other implementations, the processor 804 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further.

A bus interface 808 provides an interface between the bus 802, a transceiver 810, and an antenna array 830. The transceiver 810 provides a means for communicating with various other apparatus over a transmission medium (e.g., air interface). The antenna array 830 provides a means for digital and/or analog beamforming using, for example, the transceiver 810. In some examples, the scheduling entity 800 may include multiple transceivers 810 and antenna arrays 830, each associated with a TRP of the scheduling entity 800. Depending upon the nature of the apparatus, a user interface 812 (e.g., keypad, display, speaker, microphone, joystick) may also be provided. Of course, such a user interface 812 is optional, and may be omitted in some examples, such as a base station.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include multi-cell management circuitry 841, configured to facilitate a multi-cell transmission environment for one or more scheduled entities (UEs). In some examples, the scheduling entity 800 may serve a PCell and the multi-cell management circuitry 841 may be configured to add one or more SCells, each utilizing a different carrier, as serving cells to provide a multi-cell transmission environment for a particular scheduled entity (e.g., a UE). For example, the multi-cell management circuitry 841 may be configured to determine to activate communication between the scheduled entity and an SCell for multi-cell communication. The scheduling entity 800 may receive an activation message from the scheduled entity to activate the SCell for multi-cell communication or the multi-cell management circuitry 841 may decide to activate communication between the scheduled entity and the SCell to provide a higher data rate to the scheduled entity.

The multi-cell management circuitry 841 may further be configured to transmit a reference signal trigger to the scheduled entity upon determining to activate the SCell in order to trigger the communication of one or more reference signals between the scheduled entity and the SCell to enable the scheduled entity to synchronize with the SCell. In some examples, the reference signal trigger identifies the one or more reference signals of a plurality of reference signals configured for the scheduled entity to transmit or receive in the SCell. In some examples, the multi-cell management circuitry 841 may select the one or more reference signals from the plurality of reference signals. In this example, the one or more selected reference signals includes a subset of the plurality of reference signals. The multi-cell management circuitry 841 may further be configured to transmit a reference signal message including an indication of the one or more reference signals identified in the reference signal trigger to the SCell. The reference signal may be transmitted to the SCell via, for example, a backhaul interface (e.g., a wired or wireless connection).

In some examples, the multi-cell management circuitry 841 may be configured to transmit a MAC-CE including the reference signal trigger within a PDSCH to the scheduled entity. The multi-cell management circuitry 841 may further be configured to receive acknowledgement information (e.g., ACK/NACK) from the SCell acknowledging receipt of the MAC-CE by the scheduled entity.

In some examples, the scheduling entity 800 may serve an SCell and the multi-cell management circuitry 841 may be configured to enable the scheduled entity to synchronize with the SCell to activate multi-cell communication with the PCell and the SCell for the scheduled entity. In this example, the multi-cell management circuitry 841 may be configured to receive the reference signal message from the PCell indicating the one or more reference signals identified in the reference signal trigger transmitted to the scheduled entity. The one or more reference signals may include, but are not limited to, a CSI-RS, an SSB, or an SRS. The multi-cell management circuitry 841 may further be configured to receive the ACK/NACK from the scheduled entity in response to transmission of one or more downlink reference signals and to provide the ACK/NACK to the PCell. The multi-cell management circuitry 841 may further be configured to provide the ACK/NACK to the scheduled entity in response to receipt of one or more uplink reference signals and to further provide the ACK/NACK to the PCell. In some examples, each of the PCell and the SCell utilize a different RAT (e.g., LTE and 5G-NR).

After activation of the SCell, the multi-cell management circuitry 841 may be further configured to coordinate other downlink and uplink transmissions with the scheduled entity via a backhaul interface connection or other connection between the PCell and the SCell. The multi-cell management circuitry 841 may further be configured to execute multi-cell software 851 stored on the computer-readable medium 806 to implement one or more of the functions described herein.

The processor 804 may further include resource assignment and scheduling circuitry 842, configured to generate, schedule, and modify a resource assignment or grant of time-frequency resources (e.g., a set of one or more resource elements). For example, the resource assignment and scheduling circuitry 842 may schedule time—frequency resources within a plurality of TDD and/or FDD subframes, slots, and/or mini-slots to carry user data traffic and/or control information to and/or from multiple UEs (scheduled entities). In some examples, the resource assignment and scheduling circuitry 842 may operate in coordination with the multi-cell management circuitry 841 to schedule multi-cell transmissions to and/or from a scheduled entity.

In examples in which the scheduling entity 800 serves the PCell, the resource assignment and scheduling circuitry 842 may further be configured to schedule resources for the transmission of the reference signal trigger (e.g., MAC-CE) to the scheduled entity. The resource assignment and scheduling circuitry 842 may further be configured to schedule resources for the transmission of the reference signal message to the SCell when communicating with the SCell over a wireless backhaul link. In addition, the resource assignment and scheduling circuitry 842 may be configured to schedule resources for the transmission of the acknowledgement information from the SCell to the PCell over the wireless backhaul link.

In examples in which the scheduling entity 800 serves the SCell, the resource assignment and scheduling circuitry 842 may be configured to schedule resources (aperiodic, semi-persistent, or with a pre-determined periodicity) for the transmission of the one or more reference signals indicated in the reference signal message. For example, the resource assignment and scheduling circuitry 842 may be configured to pre-configure each of the reference signals with particular time-frequency resources and particular beams/paths. In some examples, the configuration information may include a TCI state or spatial relation indicator (SRI) that indicates the spatial beams or BPLs on which the reference signals are transmitted. In some examples, each of the reference signals may be communicated on the same or different beams or BPLs. In addition, one or more of the downlink reference signals may be transmitted from a different TRP associated with the SCell. In this example, the TCI state may include the TRP identity (ID) or equivalent cell ID.

The resource assignment and scheduling circuitry 842 may further be configured to schedule resources for the transmission of acknowledgement information either from the scheduled entity to the SCell (e.g., in response to receipt of one or more downlink reference signals by the scheduled entity) or to the scheduled entity from the SCell (e.g., in response to receipt of one or more uplink reference signals from the scheduled entity). The resource assignment and scheduling circuitry 842 may further be configured to execute resource assignment and scheduling software 852 stored on the computer-readable medium 806 to implement one or more of the functions described herein.

The processor 804 may further include communication and processing circuitry 843, configured to communicate with one or more scheduled entities (e.g., UEs) and one or more other cells in a multi-cell environment. The communication and processing circuitry 843 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 843 may be configured to generate and transmit downlink user data traffic and downlink control channels within one or more subframes, slots, and/or mini-slots in accordance with the resources assigned to the downlink user data traffic and/or downlink control information by the resource assignment and scheduling circuitry 842. In addition, the communication and processing circuitry 843 may be configured to receive and process uplink user data traffic and uplink control channels within one or more subframes, slots, and/or mini-slots in accordance with the resources assigned to the uplink user data traffic and/or uplink control information by the resource assignment and scheduling circuitry 842.

In examples in which the scheduling entity 800 serves the PCell, the communication and processing circuitry 843 may be configured to operate together with the multi-cell management circuitry 841 to generate and transmit the reference signal trigger (e.g., MAC-CE) to the scheduled entity and the reference signal message to the SCell. In addition, the communication and processing signal may further be configured to receive acknowledgement information from the SCell and to provide the acknowledgement information to the multi-cell management circuitry 841. The communication and processing circuitry 843 may further be configured to receive the activation message from the scheduled entity to activate the SCell for multi-cell communication and to provide the activation message to the multi-cell management circuitry 841.

In examples in which the scheduling entity 800 serves the SCell, the communication and processing circuitry 843 may be configured to receive the reference signal message from the PCell and to provide the reference signal message to the multi-cell management circuitry 841. The communication and processing circuitry 843 may further be configured to communicate the one or more reference signals with the scheduled entity to enable the scheduled entity to synchronize with the SCell. For example, the communication and processing circuitry 843 may be configured to generate and transmit an SSB or CSI-RS on one or more beams using the antenna array 830 and transceiver 810 via one or more TRPs in the SCell for use by the scheduled entity in synchronizing with the SCell. As another example, the communication and processing circuitry 843 may be configured to receive an SRS on one or more beams using the antenna array 830 and transceiver 810 from the scheduled entity. In addition, the communication and processing circuitry 843 may be configured to provide configuration information for each of the reference signals to the scheduled entity via, for example, RRC signaling during the initial access procedure.

In some examples, the communication and processing circuitry 843 may be configured to receive acknowledgement information (e.g., one or more ACK/NACKs, each on a separate beam) acknowledging receipt of the MAC-CE including the reference signal trigger and to provide the acknowledgement information to the multi-cell management circuitry 841. The communication and processing circuitry 843 may further be configured to operate together with the multi-cell management circuitry 841 to transmit the acknowledgement information to the PCell.

In some examples, the spatial relationship of the received ACK/NACKs may be linked to the TCI states of the triggered reference signals. In examples in which the reference signals are communicated with different TCI states (e.g., via different beams), the communication and processing circuitry 843 may receive the acknowledgement information on one or more of the beams utilized for the downlink reference signals. In some examples, the acknowledgement information may be received on each of the beams corresponding to each of the reference signals triggered by the reference signal trigger. In other examples, the acknowledgement information may be received on a subset of the beams corresponding to the triggered reference signals.

In examples in which the communication and processing circuitry 843 receives an uplink SRS from the scheduled entity, instead of receiving acknowledgment information from the scheduled entity, the communication and processing circuitry 843 may transmit an ACK/NACK to the scheduled entity on each of the beams on which the SRS is received to acknowledge receipt by the scheduled entity of the MAC-CE (e.g., as a result of receiving the SRS). In this example, the communication and processing circuitry 843 may further generate and transmit time/frequency synchronization information together with the acknowledgement information to enable the scheduled entity to synchronize with the SCell. The communication and processing circuitry 843 may discern the time/frequency synchronization information by measuring the received SRSs. The communication and processing circuitry 843 may further be configured to execute communication and processing software 853 stored on the computer-readable medium 806 to implement one or more of the functions described herein.

The processor 804 may further include beam selection circuitry 844, configured to select a serving beam pair link (BPL) between the SCell and the scheduled entity based on the different receive beams carrying the acknowledgement information. For example, the beam selection circuitry 844 may measure the signal-to-interference-plus-noise ratio (SINR) on each of the ACK/NACK beams to identify the serving BPL for the scheduled entity. The beam selection circuitry 844 may further be configured to execute beam selection software 854 stored on the computer-readable medium 806 to implement one or more of the functions described herein.

Figure 9:
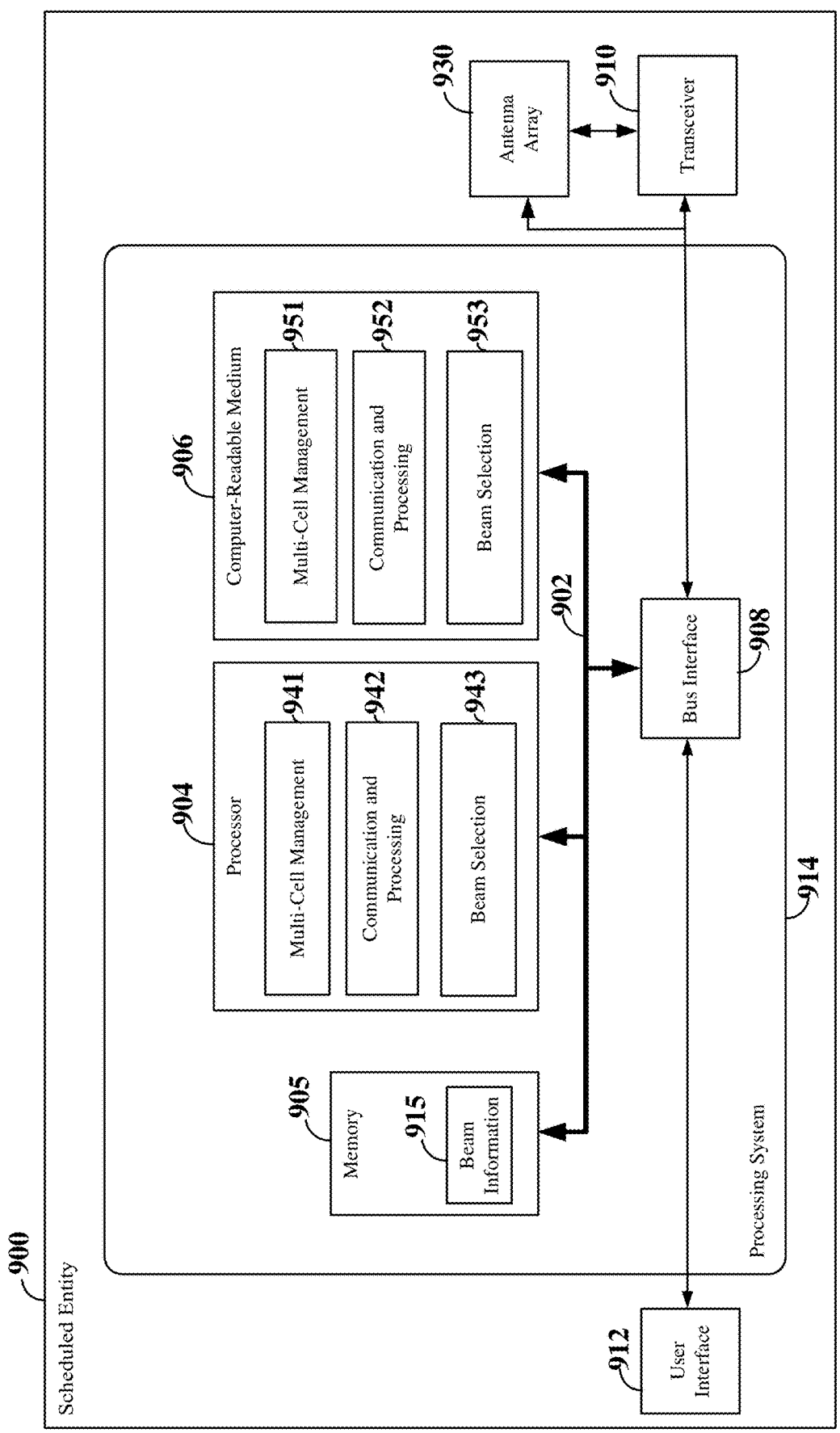
FIG. 9 is a block diagram illustrating an example of a hardware implementation for a scheduled entity employing a processing system according to some aspects.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of FIGS. 1, 2, and 5-7.

The processing system 914 may be substantially the same as the processing system 814 illustrated in FIG. 8, including a bus interface 908, a bus 902, memory 905, a processor 904, and a computer-readable medium 906. Furthermore, the scheduled entity 900 may include a user interface 912, a transceiver 910, and an antenna array 930 substantially similar to those described above in FIG. 8. That is, the processor 904, as utilized in a scheduled entity 900, may be used to implement any one or more of the processes described below.

In some aspects of the disclosure, the processor 904 may include multi-cell management circuitry 941, configured to facilitate simultaneous communication with one or more PCells and one or more SCells in a multi-cell transmission environment. In some examples, when in a connected mode with a PCell, the multi-cell management circuitry 941 may determine that an SCell should be activated to facilitate multi-cell communication. In this example, the multi-cell management circuitry 941 may be configured to transmit an activation message to the PCell to activate the SCell for multi-cell communication with the scheduled entity 900.

The multi-cell management circuitry 941 may further be configured to receive a reference signal trigger (e.g., within a MAC-CE) triggering communication of one or more reference signals between the scheduled entity 900 and the SCell. The reference signal trigger may identify one or more reference signals of a plurality of reference signals configured for use by the scheduled entity 900 in the SCell. The multi-cell management circuitry 941 may further be configured to synchronize with the SCell based on the one or more reference signals to activate the SCell.

In some examples, the multi-cell management circuitry 941 may be configured to receive the one or more downlink reference signals (e.g., CSI-RS or SSB) identified in the reference signal trigger via one or more beams in accordance with beam information 915 (e.g., the TCI states) of each of the downlink reference signals. The beam information 915 may be received, for example, during initial access and stored in memory 905. The multi-cell management circuitry 941 may then be configured to perform time/frequency synchronization with the SCell utilizing the one or more downlink reference signals. In some examples, the multi-cell management circuitry 941 may be configured to transmit an uplink reference signal (e.g., SRS) to the SCell in response to the reference signal trigger via one or more beams in accordance with the beam information 915 (e.g., SRIs) of the uplink reference signal to enable the SCell to determine time/frequency synchronization information for the scheduled entity 900. In this example, the multi-cell management circuitry 941 may further be configured to receive the time/frequency synchronization information from the SCell.

The multi-cell management circuitry 941 may further be configured to transmit acknowledgement information (e.g., ACK/NACK) acknowledging receipt of the MAC-CE carrying the reference signal trigger to the SCell. The timing of ACK/NACK transmission may be defined based on the transmission timing of the triggered downlink reference signals. In addition, the ACK/NACK spatial relationship may be linked to the TCI states 915 of the triggered downlink reference signals. For example, the ACK/NACK transmission may be repeated across uplink beams having a same spatial direction as the triggered downlink reference signals.

In examples in which the downlink reference signals are communicated with different TCI states (e.g., via different beams), the multi-cell management circuitry 941 may transmit the acknowledgement information in a beam sweeping manner across one or more of the beams utilized to receive the downlink reference signals. In some examples, the multi-cell management circuitry 941 may transmit the ACK/NACK for the MAC-CE within a beam-swept physical uplink control channel (PUCCH) with a one-to-one mapping between the PUCCH beams and the TCI states (e.g., spatial directions) of each of the triggered downlink reference signals. In this example, the ACK/NACK is transmitted on each of the beams corresponding to each of the reference signals triggered by the MAC-CE. In other examples, the multi-cell management circuitry 941 may select a subset of the triggered reference signals to measure (e.g., to utilize for synchronization) and transmit the ACK/NACK for the MAC-CE within a beam-swept PUCCH with a one-to-one mapping between the PUCCH beams and the TCI states (e.g., spatial directions) of the subset of triggered reference signals. In this example, the subset of triggered reference signals may be selected by the multi-cell management circuitry 941 based on one or more metrics.

In examples in which the reference signal trigger triggers communication of an uplink reference signal (e.g., an SRS), the multi-cell management circuitry 941 may not transmit the ACK/NACK to the SCell, but instead may receive the ACK/NACK from the SCell in response to receipt of the SRS at the SCell. For example, the multi-cell management circuitry 941 may receive the ACK/NACK from the SCell on each of the beams corresponding to the SRIs of the SRS.

In this example, the ACK/NACK may further include the time/frequency synchronization information to enable the multi-cell management circuitry 941 to synchronize with the SCell. The multi-cell management circuitry 941 may further be configured to execute multi-cell management software 951 stored on the computer-readable medium 906 to implement one or more of the functions described herein.

The processor 904 may further include communication and processing circuitry 942, configured to communicate with one or more scheduling entities (e.g., base stations serving a PCell and one or more SCells) in a multi-cell environment. The communication and processing circuitry 942 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 942 may be configured to generate and transmit uplink user data traffic and uplink control channels within one or more subframes, slots, and/or mini-slots in accordance with the resources assigned to the uplink user data traffic and/or uplink control information by the PCell or SCell. In addition, the communication and processing circuitry 942 may be configured to receive and process downlink user data traffic and downlink control channels within one or more subframes, slots, and/or mini-slots in accordance with the resources assigned to the downlink user data traffic and/or downlink control information by the PCell or SCell.

In some examples, the communication and processing circuitry 942 may be configured to receive the reference signal trigger (e.g., MAC-CE) from the PCell and provide the reference signal trigger to the multi-cell management circuitry 941. In addition, the communication and processing circuitry 942 may be configured to operate together with the multi-cell management circuitry 941 to generate and transmit the activation message to activate the SCell for multi-cell communication.

The communication and processing circuitry 942 may further be configured to receive and process one or more downlink reference signals (e.g., CSI-RS and/or SSB) identified in the reference signal trigger on one or more beams in accordance with the beam information 915 (e.g., TCI states) of the downlink reference signals to enable the multi-cell management circuitry 941 to synchronize with the SCell. In addition, the communication and processing circuitry 942 may be configured to operate together with the multi-cell management circuitry 941 to generate and transmit an uplink reference signal (e.g., SRS) identified in the reference signal trigger in accordance with the beam information 915 (e.g., SRI) associated with the uplink reference signal.

The communication and processing circuitry 942 may further be configured to operate together with the multi-cell management circuitry 941 to generate and transmit acknowledgement information to the SCell on one or more of the beams utilized for the downlink reference signals (e.g., as selected by the multi-cell management circuitry 941). In addition, the communication and processing circuitry 942 may be configured to receive and process acknowledgement information from the SCell on one or more of the beams utilized for the uplink reference signal. In this example, the communication and processing circuitry 942 may further be configured to receive time/frequency synchronization information, along with the acknowledgement information, from the SCell and to provide the time/frequency synchronization information to the multi-cell management circuitry 941 for synchronization with the SCell. The communication and processing circuitry 942 may further be configured to execute communication and processing software 952 stored on the computer-readable medium 906 to implement one or more of the functions described herein.

The processor 904 may further include beam selection circuitry 943, configured to measure the SINR or reference signal received power (RSRP) on each of the ACK/NACK beams received from the SCell and to select a serving beam pair link (BPL) between the SCell and the scheduled entity 900 based on the measured beams. In some examples, the beam selection circuitry 943 may further be configured to transmit a beam measurement report to the SCell indicating the selected BPL. The beam selection circuitry 943 may further be configured to execute beam selection software 953 stored on the computer-readable medium 906 to implement one or more of the functions described herein.

Figure 10:
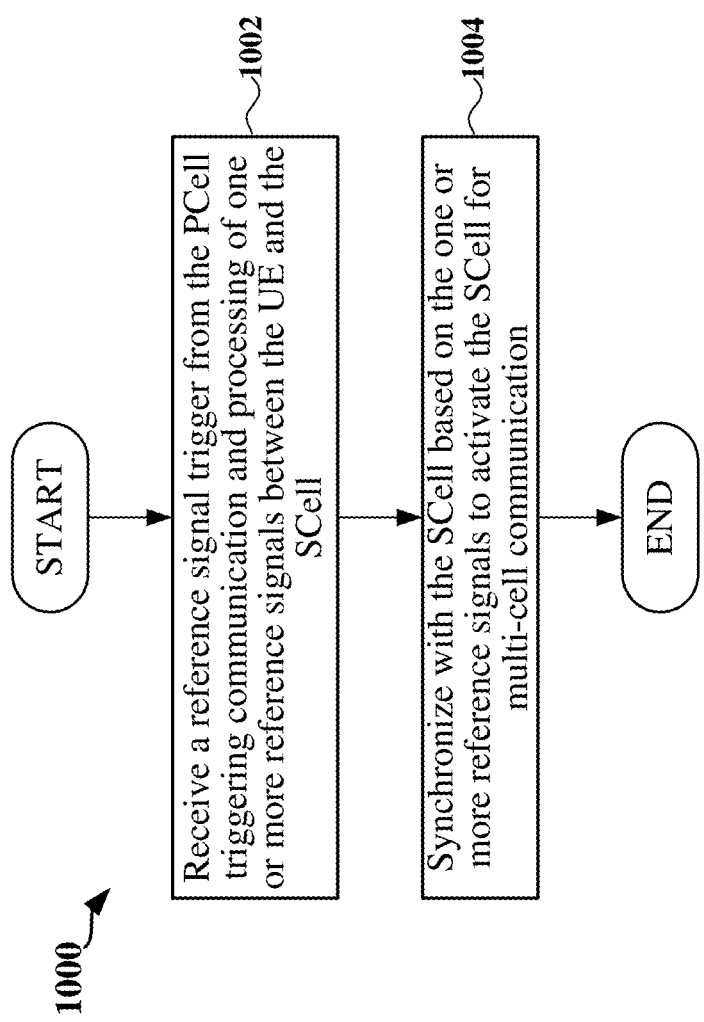
FIG. 10 is a flow chart illustrating an exemplary process for a UE to synchronize communication with an SCell to activate the SCell in a multi-cell transmission environment according to some aspects.

FIG. 10 is a flow chart illustrating an exemplary process 1000 for a UE to synchronize communication with an SCell to activate the SCell in a multi-cell transmission environment in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduled entity 900 illustrated in FIG. 9. In some examples, the process 1000 may be carried out by any suitable apparatus or means for carrying out the functions or algorithm described below.

At block 1002, the scheduled entity (e.g., a UE) may receive a reference signal trigger from the PCell triggering communication and processing of one or more reference signals between the UE and the SCell. In some examples, the reference signal trigger may identify the one or more reference signals of a plurality of reference signals configured in the SCell for the scheduled entity to transmit or receive in the SCell. In some examples, the reference signal trigger may be included in a MAC-CE transmitted in a PDSCH from the PCell. Examples of reference signals may include, but are not limited to, CSI-RS, SSB, and SRS. In some examples, the PCell includes a first radio access technology (RAT) and the SCell includes a second RAT. For example, the multi-cell management circuitry 941, communication and processing circuitry 942, and transceiver 910 shown and described above in reference to FIG. 9 may provide a means to receive the reference signal trigger from the PCell.

At block 1004, the scheduled entity may synchronize with the SCell based on the one or more reference signals to activate the SCell for multi-cell communication. In some examples, the scheduled entity may receive one or more downlink reference signals from the SCell on one or more beams in accordance with the TCI states pre-configured for the downlink reference signals. The scheduled entity may then synchronize with the SCell utilizing the one or more downlink reference signals. In other examples, the scheduled entity may transmit an uplink reference signal to the SCell on one or more beams in accordance with the SRIs of the uplink reference signal. The SCell may then determine time/frequency synchronization information based on the uplink reference signal and transmit the time/frequency synchronization information to the scheduled entity for use in synchronizing with the SCell. For example, the multi-cell management circuitry 941, communication and processing circuitry 942, and transceiver 910 shown and described above in reference to FIG. 9 may provide a means to communicate one or more reference signals with the SCell to synchronize with the SCell.

Figure 11:
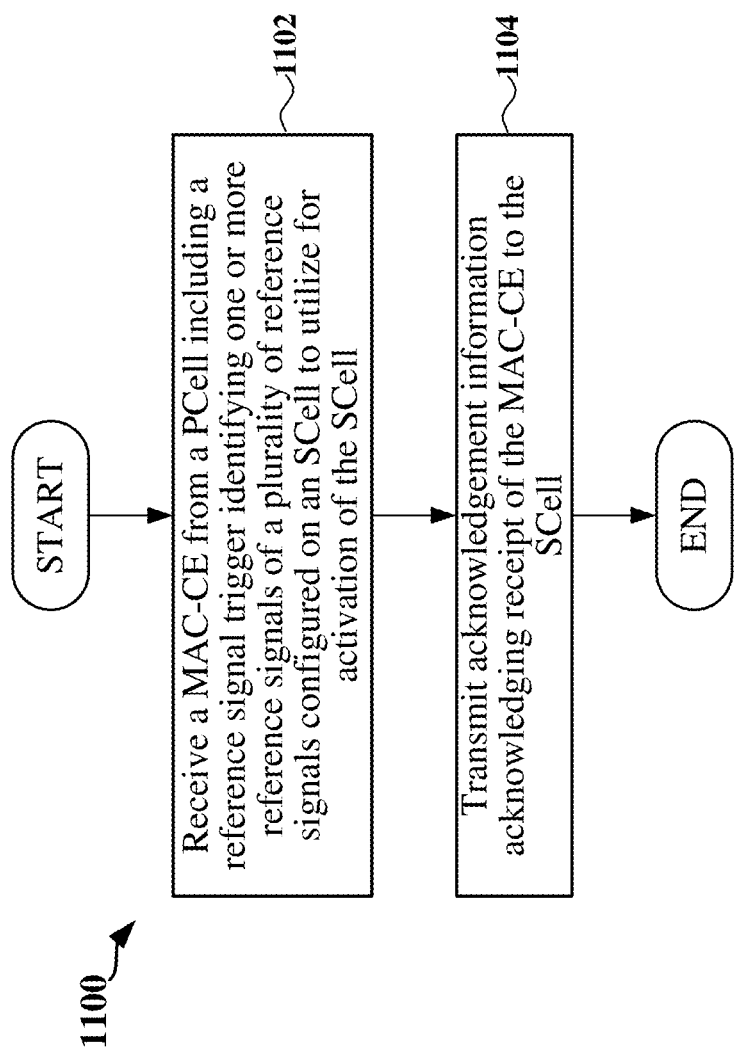
FIG. 11 a flow chart illustrating an exemplary process for a UE to process a reference signal trigger from a PCell to activate an SCell in a multi-cell transmission environment according to some aspects.

FIG. 11 is a flow chart illustrating an exemplary process 1100 for a UE to process a reference signal trigger from a PCell to activate an SCell in a multi-cell transmission environment in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduled entity 900 illustrated in FIG. 9. In some examples, the process 1100 may be carried out by any suitable apparatus or means for carrying out the functions or algorithm described below.

At block 1102, the scheduled entity (e.g., a UE) may receive a MAC-CE including a reference signal trigger from the PCell identifying one or more reference signals of a plurality of reference signals configured in the SCell to utilize for activation of the SCell. Examples of reference signals may include, but are not limited to, CSI-RS, SSB, and SRS. For example, the multi-cell management circuitry 941, communication and processing circuitry 942, and transceiver 910 shown and described above in reference to FIG. 9 may provide a means to receive the MAC-CE including the reference signal trigger from the PCell.

At block 1104, the scheduled entity may transmit acknowledgement information acknowledging receipt of the MAC-CE to the SCell. In some examples, the scheduled entity may transmit the acknowledgement information on at least one beam associated with at least one of the one or more reference signals for selection of a serving beam pair link for communication between the SCell and the scheduled entity. For example, the multi-cell management circuitry 941, communication and processing circuitry 942, and transceiver 910 shown and described above in reference to FIG. 9 may provide a means to transmit the acknowledgement information to the SCell.

Figure 12:
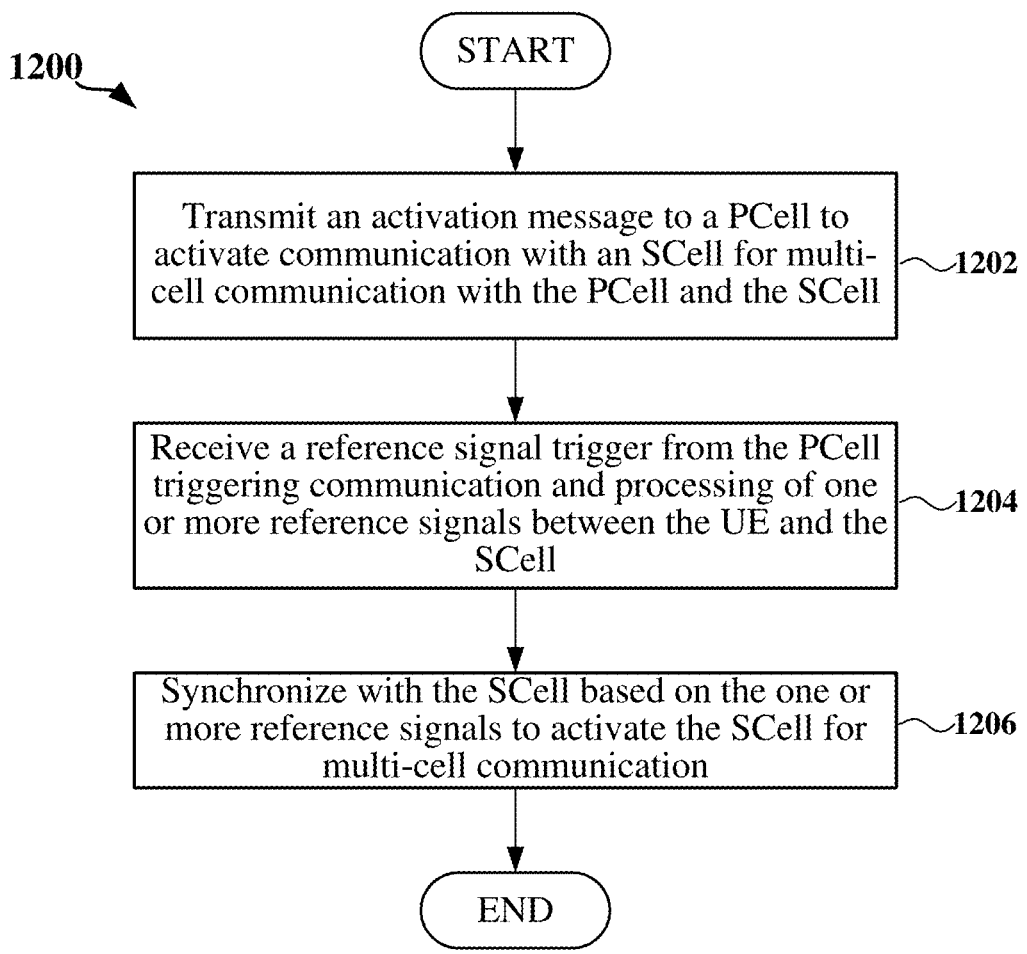
FIG. 12 a flow chart illustrating another exemplary process for a UE to synchronize communication with an SCell to activate the SCell in a multi-cell transmission environment according to some aspects.

FIG. 12 is a flow chart illustrating another exemplary process 1200 for a UE to synchronize communication with an SCell to activate the SCell in a multi-cell transmission environment in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduled entity 900 illustrated in FIG. 9. In some examples, the process 1200 may be carried out by any suitable apparatus or means for carrying out the functions or algorithm described below.

At block 1202, the scheduled entity (e.g., a UE) may transmit an activation message to a PCell to activate communication with an SCell for multi-cell communication with the PCell and the SCell. For example, the multi-cell management circuitry 941, communication and processing circuitry 942, and transceiver 910 shown and described above in reference to FIG. 9 may provide a means to transmit the activation message to the PCell.

At block 1204, the scheduled entity may receive a reference signal trigger from the PCell triggering communication and processing of one or more reference signals between the UE and the SCell. In some examples, the reference signal trigger may identify the one or more reference signals of a plurality of reference signals configured in the SCell for the scheduled entity to transmit or receive in the SCell. In some examples, the reference signal trigger may be included in a MAC-CE transmitted in a PDSCH from the PCell. Examples of reference signals may include, but are not limited to, CSI-RS, SSB, and SRS. For example, the multi-cell management circuitry 941, communication and processing circuitry 942, and transceiver 910 shown and described above in reference to FIG. 9 may provide a means to receive the reference signal trigger from the PCell.

At block 1206, the scheduled entity may synchronize with the SCell based on the one or more reference signals to activate the SCell for multi-cell communication. In some examples, the scheduled entity may receive one or more downlink reference signals from the SCell on one or more beams in accordance with the TCI states pre-configured for the downlink reference signals. The scheduled entity may then synchronize with the SCell utilizing the one or more downlink reference signals. In other examples, the scheduled entity may transmit an uplink reference signal to the SCell on one or more beams in accordance with the SRIs of the uplink reference signal. The SCell may then determine time/frequency synchronization information based on the uplink reference signal and transmit the time/frequency synchronization information to the scheduled entity for use in synchronizing with the SCell. For example, the multi-cell management circuitry 941, communication and processing circuitry 942, and transceiver 910 shown and described above in reference to FIG. 9 may provide a means to communicate one or more reference signals with the SCell to synchronize with the SCell.

In one configuration, the scheduling entity 900 (e.g., a UE) includes means for activating an SCell in a multi-cell transmission environment as described in the present disclosure. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, 4-7 and/or 9, and utilizing, for example, the processes and/or algorithms described herein in relation to FIGS. 10-12.

Figure 13:
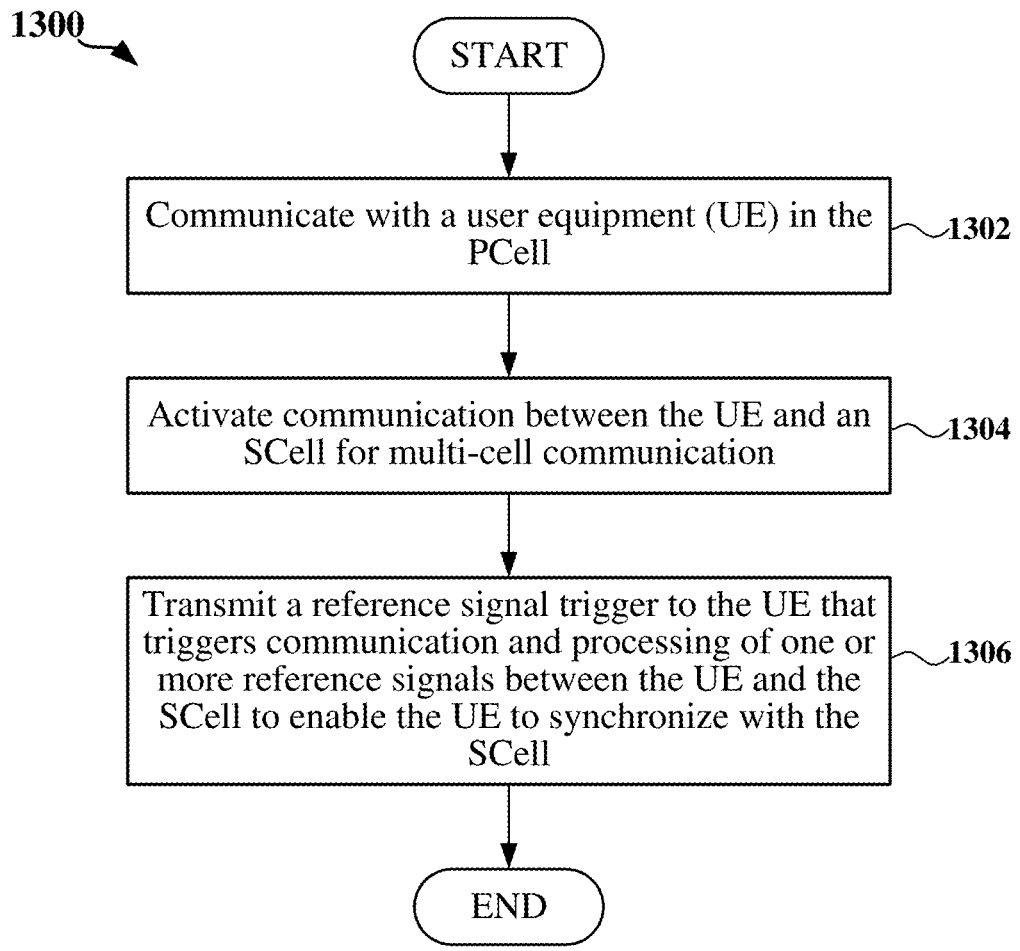
FIG. 13 is a flow chart illustrating an exemplary process for a scheduling entity serving a primary serving cell (PCell) to activate communication between a scheduled entity and an SCell in a multi-cell transmission environment according to some aspects.

FIG. 13 is a flow chart illustrating an exemplary process 1300 for a scheduling entity serving a PCell to activate communication between a scheduled entity and an SCell in a multi-cell transmission environment in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity 800 illustrated in FIG. 8. In some examples, the process 1300 may be carried out by any suitable apparatus or means for carrying out the functions or algorithm described below.

At block 1302, the scheduling entity (e.g., a base station) may communicate with the scheduled entity (e.g., a UE) in the PCell in a multi-cell environment. For example, the multi-cell management circuitry 841, communication and processing circuitry 843, and transceiver 810 shown and described above in reference to FIG. 8 may provide a means to communicate with the scheduled entity.

At block 1304, the scheduling entity may determine to activate communication between the scheduled entity and the SCell for multi-cell communication. In some examples, the scheduling entity may receive an activation message from the scheduled entity to activate the SCell for multi-cell communication. In other examples, the scheduling entity may activate communication between the scheduled entity and the SCell, for example, to provide a higher data rate to the scheduled entity. In some examples, the PCell includes a first RAT and the SCell includes a second RAT. For example, the multi-cell management circuitry 841 shown and described above in reference to FIG. 8 may provide a means to activate communication between the scheduled entity and the SCell.

At block 1306, the scheduling entity may transmit a reference signal trigger to the scheduled entity that triggers communication and processing of one or more reference signals between the scheduled entity and the SCell to enable the scheduled entity to synchronize with the SCell. Examples of reference signals include, but are not limited to, CSI-RS, SSB, and SRS. In some examples, the reference signal trigger may identify the one or more reference signals of a plurality of reference signals configured in the SCell. For example, the scheduling entity may select the one or more reference signals from the plurality of reference signals such that the reference signal trigger identifies a subset of the plurality of reference signals for use by the scheduled entity in synchronizing with the SCell. In some examples, the reference signal trigger is included in a MAC-CE that is transmitted within a PDSCH from the PCell to the scheduled entity. For example, the multi-cell management circuitry 841, communication and processing circuitry 843, and transceiver 810 shown and described above in reference to FIG. 8 may provide a means to transmit the reference signal trigger to the scheduled entity.

Figure 14:
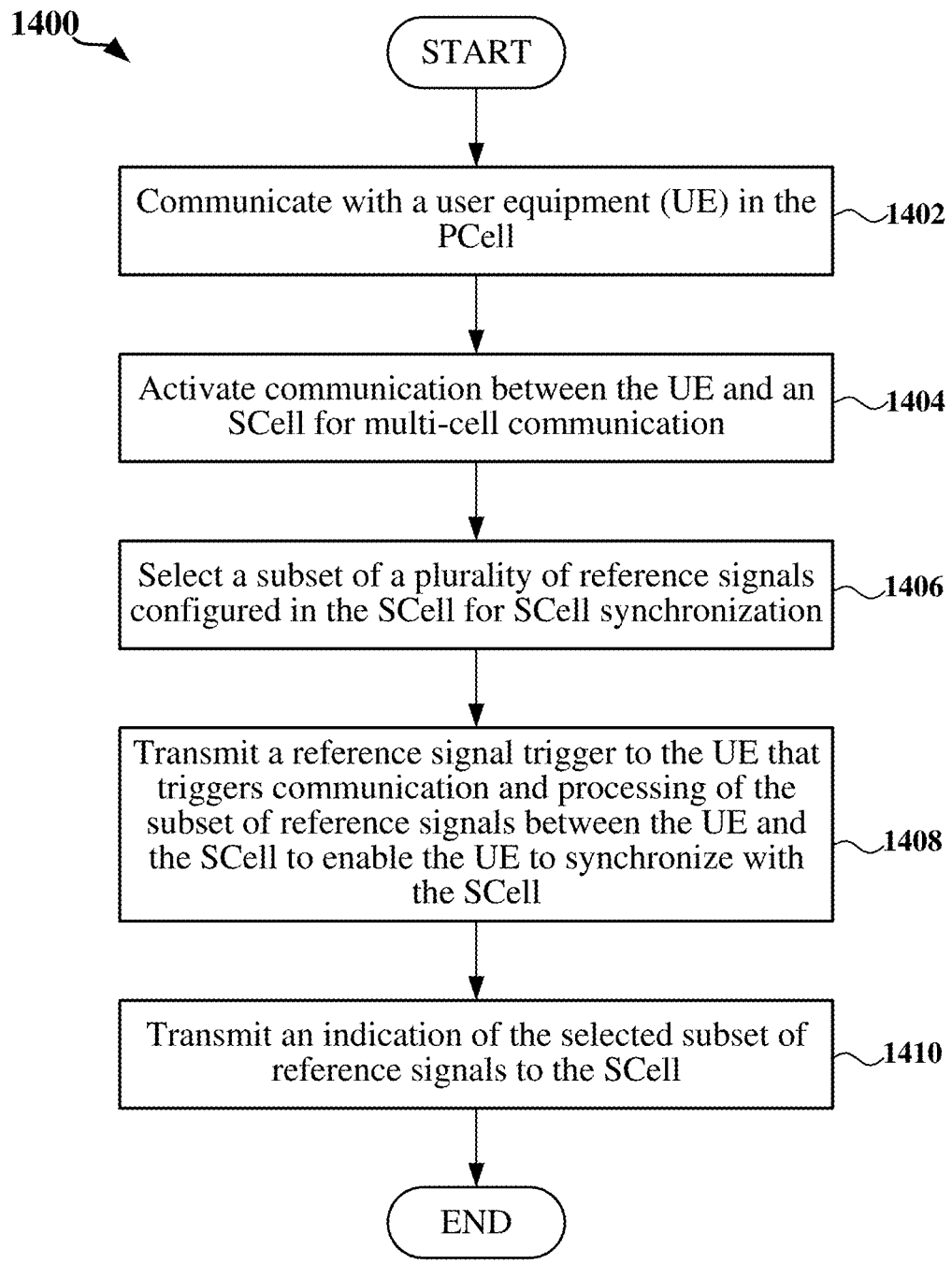
FIG. 14 is a flow chart illustrating another exemplary process for a scheduling entity serving a primary serving cell (PCell) to activate communication between a scheduled entity and an SCell in a multi-cell transmission environment according to some aspects.

FIG. 14 is a flow chart illustrating another exemplary process 1400 for a scheduling entity serving a PCell to activate communication between a scheduled entity and an SCell in a multi-cell transmission environment in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity 800 illustrated in FIG. 8. In some examples, the process 1400 may be carried out by any suitable apparatus or means for carrying out the functions or algorithm described below.

At block 1402, the scheduling entity (e.g., a base station) may communicate with the scheduled entity (e.g., a UE) in the PCell in a multi-cell environment. For example, the multi-cell management circuitry 841, communication and processing circuitry 843, and transceiver 810 shown and described above in reference to FIG. 8 may provide a means to communicate with the scheduled entity.

At block 1404, the scheduling entity may determine to activate communication between the scheduled entity and the SCell for multi-cell communication. In some examples, the scheduling entity may receive an activation message from the scheduled entity to activate the SCell for multi-cell communication. In other examples, the scheduling entity may activate communication between the scheduled entity and the SCell, for example, to provide a higher data rate to the scheduled entity. For example, the multi-cell management circuitry 841 shown and described above in reference to FIG. 8 may provide a means to activate communication between the scheduled entity and the SCell.

At block 1406, the scheduling entity may select a subset of a plurality of reference signals configured in the SCell for SCell synchronization with the scheduled entity. For example, the multi-cell management circuitry 841, communication and processing circuitry 843, and transceiver 810 shown and described above in reference to FIG. 8 may provide a means to select a subset of SCell reference signals for SCell synchronization with the scheduled entity.

At block 1408, the scheduling entity may transmit a reference signal trigger to the scheduled entity that triggers communication and processing of the subset of reference signals between the scheduled entity and the SCell to enable the scheduled entity to synchronize with the SCell. Examples of reference signals include, but are not limited to, CSI-RS, SSB, and SRS. In some examples, the reference signal trigger is included in a MAC-CE that is transmitted within a PDSCH from the PCell to the scheduled entity. For example, the multi-cell management circuitry 841, communication and processing circuitry 843, and transceiver 810 shown and described above in reference to FIG. 8 may provide a means to transmit the reference signal trigger to the scheduled entity.

At block 1410, the scheduling entity may transmit an indication of the selected subset of reference signals to the SCell. For example, the scheduling entity may transmit the indication of the selected subset of reference signals via backhaul signaling. For example, the multi-cell management circuitry 841, communication and processing circuitry 843, and transceiver 810 shown and described above in reference to FIG. 8 may provide a means to transmit the indication of the selected subset of reference signals to the SCell.

Figure 15:
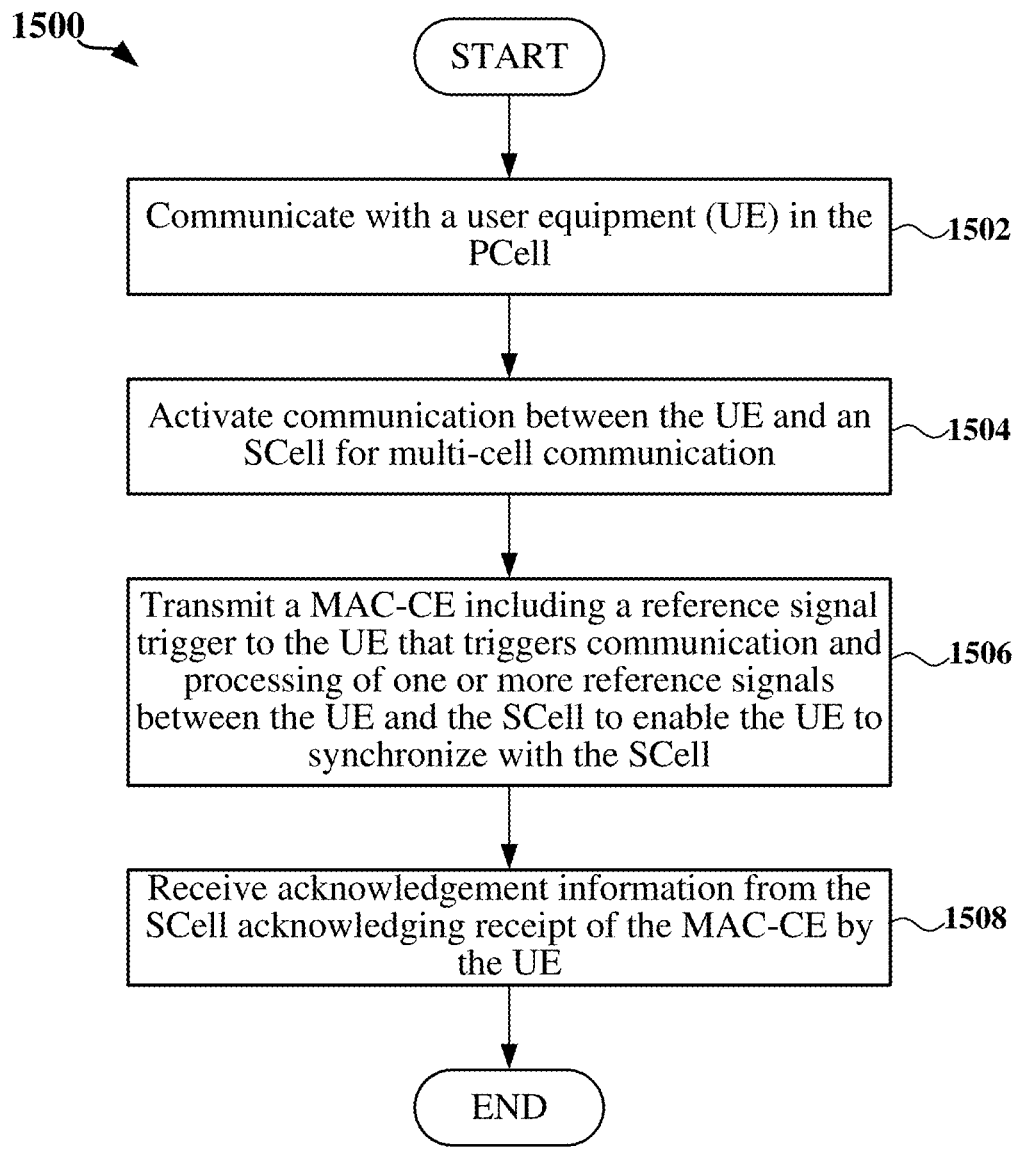
FIG. 15 is a flow chart illustrating another exemplary process for a scheduling entity serving a primary serving cell (PCell) to activate communication between a scheduled entity and an SCell in a multi-cell transmission environment according to some aspects.

FIG. 15 is a flow chart illustrating another exemplary process 1500 for a scheduling entity serving a PCell to activate communication between a scheduled entity and an SCell in a multi-cell transmission environment in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduling entity 800 illustrated in FIG. 8. In some examples, the process 1500 may be carried out by any suitable apparatus or means for carrying out the functions or algorithm described below.

At block 1502, the scheduling entity (e.g., a base station) may communicate with the scheduled entity (e.g., a UE) in the PCell in a multi-cell environment. For example, the multi-cell management circuitry 841, communication and processing circuitry 843, and transceiver 810 shown and described above in reference to FIG. 8 may provide a means to communicate with the scheduled entity.

At block 1504, the scheduling entity may determine to activate communication between the scheduled entity and the SCell for multi-cell communication. In some examples, the scheduling entity may receive an activation message from the scheduled entity to activate the SCell for multi-cell communication. In other examples, the scheduling entity may activate communication between the scheduled entity and the SCell, for example, to provide a higher data rate to the scheduled entity. For example, the multi-cell management circuitry 841 shown and described above in reference to FIG. 8 may provide a means to activate communication between the scheduled entity and the SCell.

At block 1506, the scheduling entity may transmit a MAC-CE including a reference signal trigger to the scheduled entity that triggers communication and processing of one or more reference signals between the scheduled entity and the SCell to enable the scheduled entity to synchronize with the SCell. Examples of reference signals include, but are not limited to, CSI-RS, SSB, and SRS. In some examples, the reference signal trigger may identify the one or more reference signals of a plurality of reference signals configured in the SCell. For example, the scheduling entity may select the one or more reference signals from the plurality of reference signals such that the reference signal trigger identifies a subset of the plurality of reference signals for use by the scheduled entity in synchronizing with the SCell. For example, the multi-cell management circuitry 841, communication and processing circuitry 843, and transceiver 810 shown and described above in reference to FIG. 8 may provide a means to transmit the reference signal trigger to the scheduled entity.

At block 1508, the scheduling entity may receive acknowledgement information from the SCell acknowledging receipt of the MAC-CE by the scheduled entity. For example, the acknowledgement information may be communicated from the scheduled entity to the SCell and the SCell may then provide the acknowledgement information to the PCell via, for example, backhaul signaling. For example, the multi-cell management circuitry 841, communication and processing circuitry 843, and transceiver 810 shown and described above in reference to FIG. 8 may provide a means to receive the acknowledgement information from the SCell.

Figure 16:
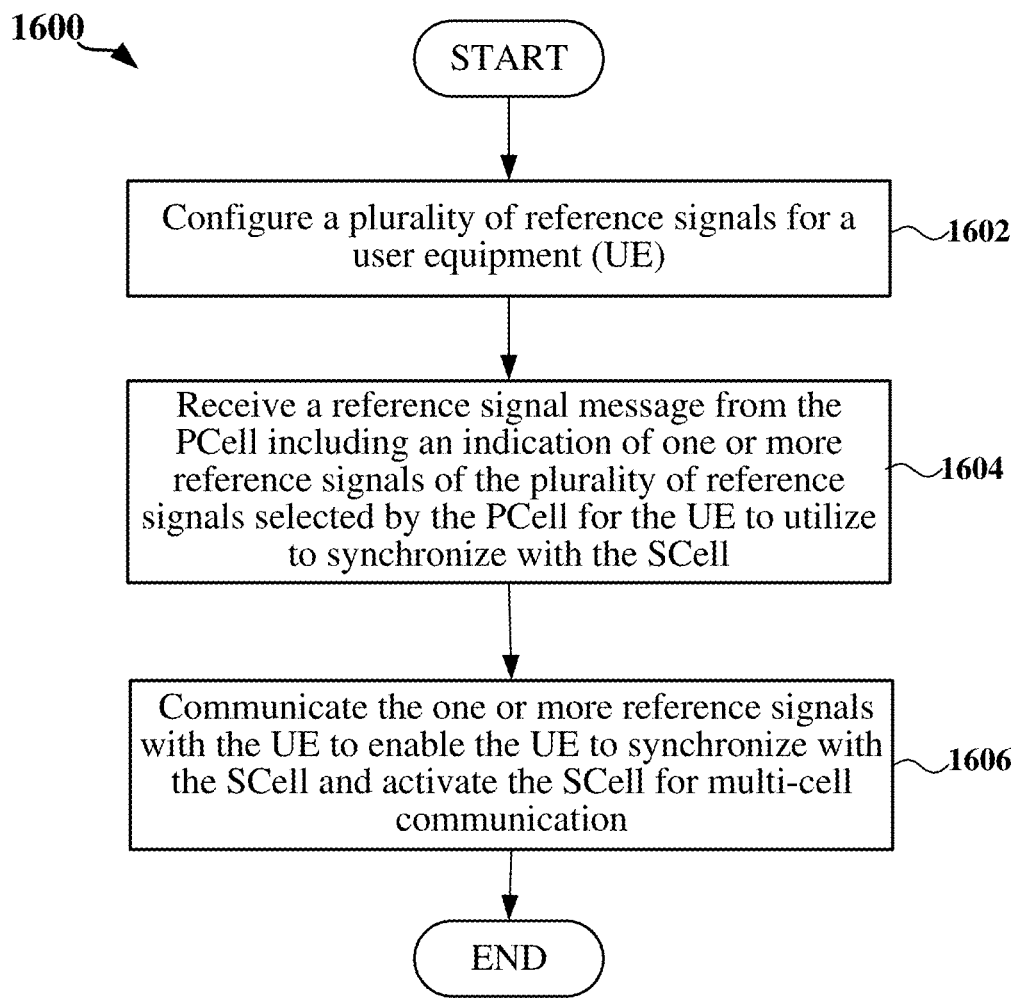
FIG. 16 is a flow chart illustrating an exemplary process for a scheduling entity serving an SCell to facilitate synchronization with a scheduled entity to activate the SCell for communication with the scheduled entity in a multi-cell transmission environment according to some aspects.

FIG. 16 is a flow chart illustrating an exemplary process 1600 for a scheduling entity serving an SCell to facilitate synchronization with a scheduled entity to activate the SCell for communication with the scheduled entity in a multi-cell transmission environment in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduling entity 800 illustrated in FIG. 8. In some examples, the process 1600 may be carried out by any suitable apparatus or means for carrying out the functions or algorithm described below.

At block 1602, the scheduling entity (e.g., a base station) may configure a plurality of reference signals for a scheduled entity (e.g., a UE). Examples of reference signals may include, but are not limited to, CSI-RS, SSB, and SRS. For example, the scheduling entity may configure the TCI state or SRI (e.g., spatial beams) for each of the reference signals. The scheduling entity may further communicate beam information indicating the TCI state or SRI to the scheduled entity during, for example, initial access of the scheduled entity in the SCell. For example, the multi-cell management circuitry 841, communication and processing circuitry 843, and transceiver 810 shown and described above in reference to FIG. 8 may provide a means to configure the plurality of reference signals.

At block 1604, the scheduling entity may receive a reference signal message from the PCell including an indication of one or more reference signals of the plurality of reference signals selected by the PCell for the UE to utilize to synchronize with the SCell. For example, the multi-cell management circuitry 841 shown and described above in reference to FIG. 8 may provide a means to receive the reference signal message.

At block 1606, the scheduling entity may communicate the one or more reference signals with the scheduled entity to enable the scheduled entity to synchronize with the SCell and activate the SCell for multi-cell communication. In some examples, the scheduling entity may transmit one or more downlink reference signals in the SCell on one or more beams in accordance with the TCI states pre-configured for the downlink reference signals. The scheduled entity may then synchronize with the SCell utilizing the one or more downlink reference signals. In other examples, the scheduling entity may receive an uplink reference signal from the scheduled entity on one or more beams in accordance with the SRI of the uplink reference signal. The scheduling entity may then determine time/frequency synchronization information based on the uplink reference signal and transmit the time/frequency synchronization information to the scheduled entity for use in synchronizing with the SCell. For example, the multi-cell management circuitry 841, communication and processing circuitry 843, and transceiver 810 shown and described above in reference to FIG. 8 may provide a means to communicate the one or more reference signals with the scheduled entity.

Figure 17:
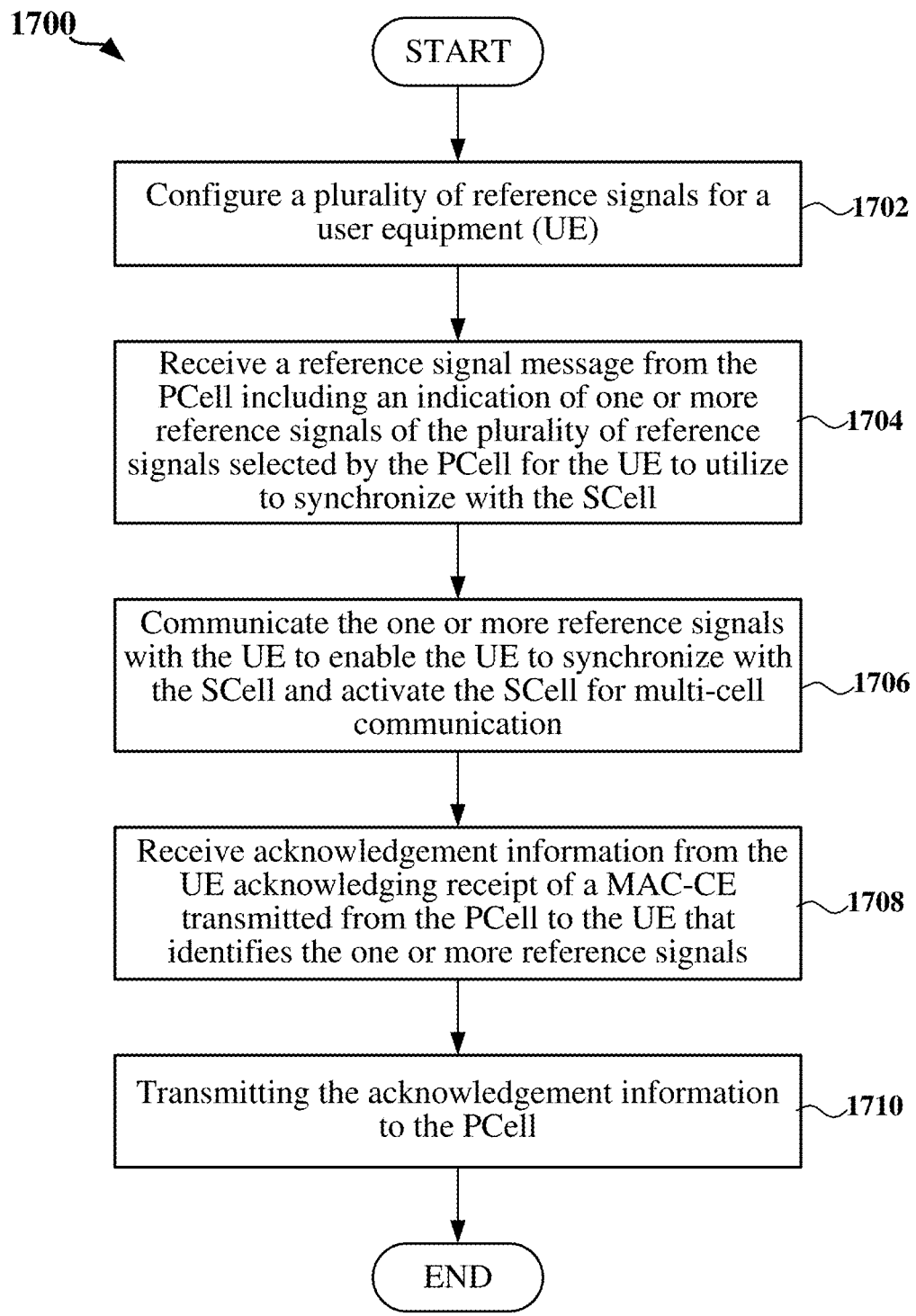
FIG. 17 is a flow chart illustrating another exemplary process for a scheduling entity serving an SCell to facilitate synchronization with a scheduled entity to activate the SCell for communication with the scheduled entity in a multi-cell transmission environment according to some aspects.

FIG. 17 is a flow chart illustrating another exemplary process 1700 for a scheduling entity serving an SCell to facilitate synchronization with a scheduled entity to activate the SCell for communication with the scheduled entity in a multi-cell transmission environment in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduling entity 800 illustrated in FIG. 8. In some examples, the process 1700 may be carried out by any suitable apparatus or means for carrying out the functions or algorithm described below.

At block 1702, the scheduling entity (e.g., a base station) may configure a plurality of reference signals for a scheduled entity (e.g., a UE). Examples of reference signals may include, but are not limited to, CSI-RS, SSB, and SRS. For example, the scheduling entity may configure the TCI state or SRI (e.g., spatial beams) for each of the reference signals. The scheduling entity may further communicate beam information indicating the TCI state or SRI to the scheduled entity during, for example, initial access of the scheduled entity in the SCell. For example, the multi-cell management circuitry 841, communication and processing circuitry 843, and transceiver 810 shown and described above in reference to FIG. 8 may provide a means to configure the plurality of reference signals.

At block 1704, the scheduling entity may receive a reference signal message from the PCell including an indication of one or more reference signals of the plurality of reference signals selected by the PCell for the UE to utilize to synchronize with the SCell. For example, the multi-cell management circuitry 841 shown and described above in reference to FIG. 8 may provide a means to receive the reference signal message.

At block 1706, the scheduling entity may communicate the one or more reference signals with the scheduled entity to enable the scheduled entity to synchronize with the SCell and activate the SCell for multi-cell communication. In some examples, the scheduling entity may transmit one or more downlink reference signals in the SCell on one or more beams in accordance with the TCI states pre-configured for the downlink reference signals. The scheduled entity may then synchronize with the SCell utilizing the one or more downlink reference signals. In other examples, the scheduling entity may receive an uplink reference signal from the scheduled entity on one or more beams in accordance with the SRI of the uplink reference signal. The scheduling entity may then determine time/frequency synchronization information based on the uplink reference signal and transmit the time/frequency synchronization information to the scheduled entity for use in synchronizing with the SCell. For example, the multi-cell management circuitry 841, communication and processing circuitry 843, and transceiver 810 shown and described above in reference to FIG. 8 may provide a means to communicate the one or more reference signals with the scheduled entity.

At block 1708, the scheduling entity may receive acknowledgement information from the scheduled entity acknowledging receipt of a MAC-CE transmitted from the PCell to the scheduled entity that identifies each of the one or more reference signals to be communicated between the scheduled entity and the scheduling entity (e.g., SCell). For example, the multi-cell management circuitry 841, communication and processing circuitry 843, and transceiver 810 shown and described above in reference to FIG. 8 may provide a means to receive the acknowledgement information from the scheduled entity.

At block 1710, the scheduling entity may transmit the acknowledgement information to the PCell. For example, the multi-cell management circuitry 841, communication and processing circuitry 843, and transceiver 810 shown and described above in reference to FIG. 8 may provide a means to transmit the acknowledgement information to the PCell.

Figure 18:
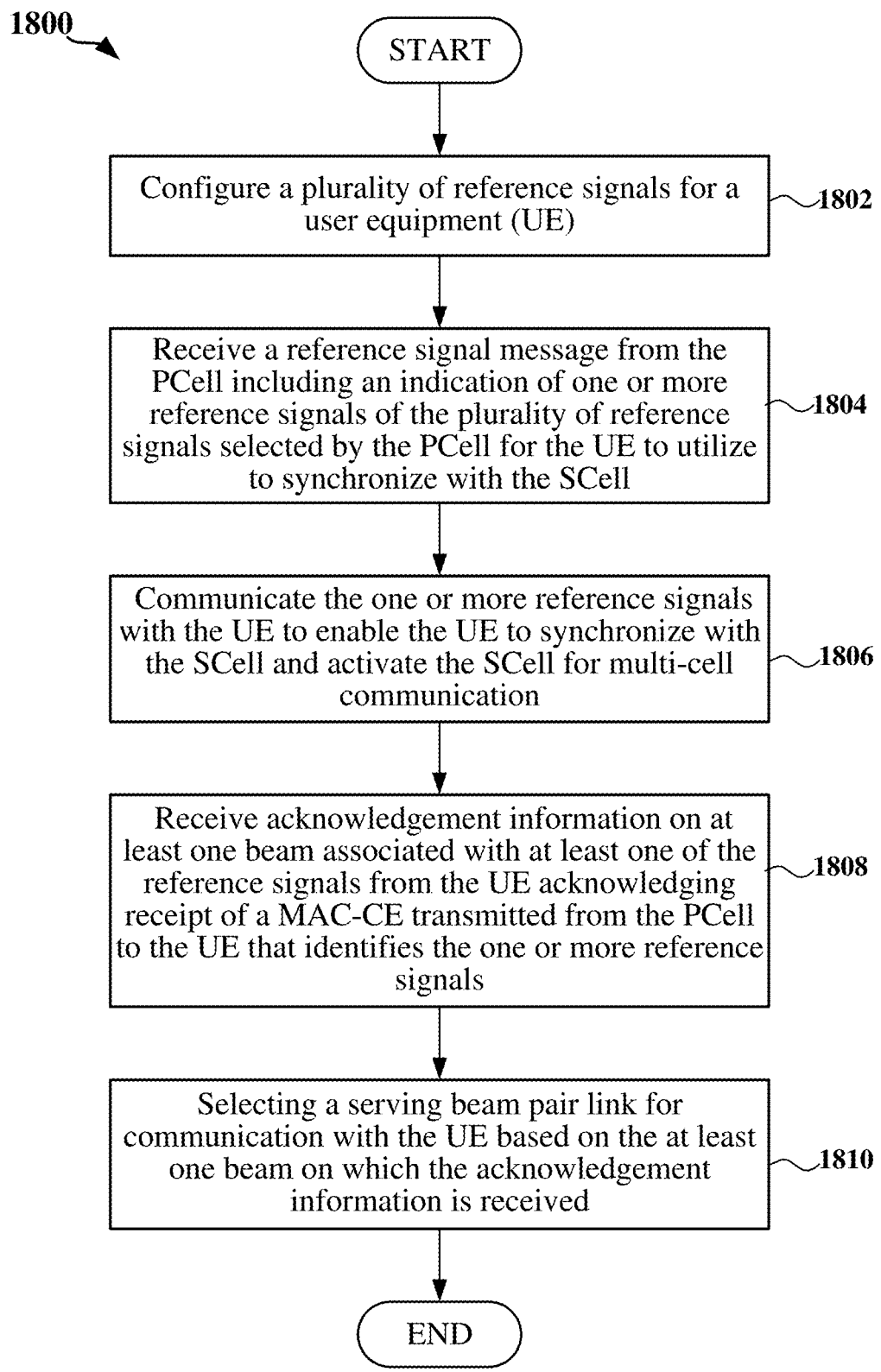
FIG. 18 is a flow chart illustrating another exemplary process for a scheduling entity serving an SCell to facilitate synchronization with a scheduled entity to activate the SCell for communication with the scheduled entity in a multi-cell transmission environment according to some aspects.

FIG. 18 is a flow chart illustrating another exemplary process 1800 for a scheduling entity serving an SCell to facilitate synchronization with a scheduled entity to activate the SCell for communication with the scheduled entity in a multi-cell transmission environment in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the scheduling entity 800 illustrated in FIG. 8. In some examples, the process 1800 may be carried out by any suitable apparatus or means for carrying out the functions or algorithm described below.

At block 1802, the scheduling entity (e.g., a base station) may configure a plurality of reference signals for a scheduled entity (e.g., a UE). Examples of reference signals may include, but are not limited to, CSI-RS, SSB, and SRS. For example, the scheduling entity may configure the TCI state or SRI (e.g., spatial beams) for each of the reference signals. The scheduling entity may further communicate beam information indicating the TCI state or SRI to the scheduled entity during, for example, initial access of the scheduled entity in the SCell. For example, the multi-cell management circuitry 841, communication and processing circuitry 843, and transceiver 810 shown and described above in reference to FIG. 8 may provide a means to configure the plurality of reference signals.

At block 1804, the scheduling entity may receive a reference signal message from the PCell including an indication of one or more reference signals of the plurality of reference signals selected by the PCell for the UE to utilize to synchronize with the SCell. For example, the multi-cell management circuitry 841 shown and described above in reference to FIG. 8 may provide a means to receive the reference signal message.

At block 1806, the scheduling entity may communicate the one or more reference signals with the scheduled entity to enable the scheduled entity to synchronize with the SCell and activate the SCell for multi-cell communication. In some examples, the scheduling entity may transmit one or more downlink reference signals in the SCell on one or more beams in accordance with the TCI states pre-configured for the downlink reference signals. The scheduled entity may then synchronize with the SCell utilizing the one or more downlink reference signals. In other examples, the scheduling entity may receive an uplink reference signal from the scheduled entity on one or more beams in accordance with the SRI of the uplink reference signal. The scheduling entity may then determine time/frequency synchronization information based on the uplink reference signal and transmit the time/frequency synchronization information to the scheduled entity for use in synchronizing with the SCell. For example, the multi-cell management circuitry 841, communication and processing circuitry 843, and transceiver 810 shown and described above in reference to FIG. 8 may provide a means to communicate the one or more reference signals with the scheduled entity.

At block 1808, the scheduling entity may receive acknowledgement information on at least one beam associated with at least one of the reference signals from the scheduled entity acknowledging receipt of a MAC-CE transmitted from the PCell to the scheduled entity that identifies each of the one or more reference signals to be communicated between the scheduled entity and the scheduling entity (e.g., SCell). In some examples, the scheduling entity may receive the acknowledgement information on at least one beam associated with at least one selected reference signal selected by the scheduled entity. For example, the multi-cell management circuitry 841, communication and processing circuitry 843, and transceiver 810 shown and described above in reference to FIG. 8 may provide a means to receive the acknowledgement information from the scheduled entity.

At block 1810, the scheduling entity may select a serving beam pair link for communication with the scheduled entity based on the at least one beam on which the acknowledgement information is received. For example, the beam selection circuitry 844 shown and described above in reference to FIG. 8 may provide a means to select the serving beam pair link.

In one configuration, the scheduling entity 800 (e.g., base station) includes means for activating an SCell for communication with a scheduled entity (e.g., UE) in a multi-cell transmission environment as described in the present disclosure. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1,2, and/or 4-8, and utilizing, for example, the processes and/or algorithms described herein in relation to FIGS. 13-18.

The following provides an overview of examples of the present disclosure.

Example 1

A method for a user equipment (UE) to communicate in a wireless communication network comprising a primary serving cell (PCell) and a secondary serving cell (SCell), the method comprising: receiving a reference signal trigger from the PCell triggering communication and processing of one or more reference signals between the UE and the SCell; and synchronizing with the SCell based on the one or more reference signals to activate the SCell for multi-cell communication.

Example 2

The method of example 1, wherein the reference signal trigger identifies the one or more reference signals of a plurality of reference signals configured in the SCell.

Example 3

The method of example 1 or 2, wherein the receiving the reference signal trigger further comprises: receiving a medium access control-control element (MAC-CE) comprising the reference signal trigger.

Example 4

The method of any of examples 1 through 3, further comprising: transmitting acknowledgement information acknowledging receipt of the MAC-CE to the SCell.

Example 5

The method of any of examples 1 through 4, wherein the transmitting the acknowledgement information further comprises: transmitting the acknowledgement information on at least one beam associated with at least one of the one or more reference signals for selection of a serving beam pair link for communication between the SCell and the UE.

Example 6

The method of any of examples 1 through 5, wherein the one or more reference signals comprise at least one of a channel state information-reference signal (CSI-RS), a synchronization signal block (SSB), or a sounding reference signal (SRS).

Example 7

The method of any of examples 1 through 6, further comprising: transmitting an uplink reference signal of the one or more reference signals to the SCell in response to receiving the reference signal trigger.

Example 8

The method of any of examples 1 through 7, wherein the PCell comprises a first radio access technology (RAT) and the SCell comprises a second RAT.

Example 9

The method of any of examples 1 through 8, further comprising: transmitting an activation message to the PCell to activate communication with the SCell for the multi-cell communication with the PCell and the SCell.

Example 10

A scheduled entity in a wireless communication network comprising a primary serving cell (PCell) and a secondary serving cell (SCell), the scheduled entity comprising a transceiver, a memory, and a processor communicatively coupled to the transceiver and the memory, the processor and memory configured to perform a method of any one of examples 1 through 9.

Example 11

A method for a primary serving cell (PCell) to facilitate multi-cell communication in a wireless communication network comprising the PCell and a secondary serving cell (SCell), the method comprising: communicating with a user equipment (UE) in the PCell; activating communication between the UE and the SCell for the multi-cell communication; and transmitting a reference signal trigger to the UE that triggers communication and processing of one or more reference signals between the UE and the SCell to enable the UE to synchronize with the SCell.

Example 12

The method of example 11, wherein the activating communication between the UE and the SCell further comprises: receiving an activation message from the UE to activate the SCell for the multi-cell communication.

Example 13

The method of example 11 or 12, wherein the reference signal trigger identifies the one or more reference signals of a plurality of reference signals configured in the SCell.

Example 14

The method of any of examples 11 through 13, further comprising: selecting the one or more reference signals from the plurality of reference signals, wherein the one or more reference signals comprise a subset of the plurality of reference signals.

Example 15

The method of any of examples 11 through 14, further comprising: transmitting an indication of the one or more reference signals identified in the reference signal trigger to the SCell.

Example 16

The method of any of examples 11 through 15, wherein the transmitting the reference signal trigger further comprises: transmitting a medium access control-control element (MAC-CE) comprising the reference signal trigger.

Example 17

The method of any of examples 11 through 16, further comprising: receiving acknowledgement information from the SCell acknowledging receipt of the MAC-CE by the UE, wherein the acknowledgement information is communicated from the UE to the SCell.

Example 18

The method of any of examples 11 through 17, wherein the PCell comprises a first radio access technology (RAT) and the SCell comprises a second RAT.

Example 19

A method for a secondary serving cell (SCell) to facilitate multi-cell communication in a wireless communication network comprising a primary serving cell (PCell) and the SCell, the method comprising: configuring a plurality of reference signals in the SCell; receiving a reference signal message from the PCell comprising an indication of one or more reference signals of the plurality of reference signals selected by the PCell for a user equipment (UE) to utilize to synchronize with the SCell; and communicating the one or more reference signals with the UE to enable the UE to synchronize with the SCell and activate the SCell for the multi-cell communication.

Example 20

The method of example 19, further comprising: receiving acknowledgement information from the UE acknowledging receipt of a medium access control-control element (MAC-CE) transmitted from the PCell to the UE, wherein the MAC-CE identifies each of the one or more reference signals to be communicated between the UE and the SCell.

Example 21

The method of example 19 or 20, wherein the receiving the acknowledgement information further comprises: receiving the acknowledgement information on at least one beam associated with at least one of the one or more reference signals.

Example 22

The method of any of examples 19 through 21, further comprising: selecting a serving beam pair link for communication with the UE based on the at least one beam on which the acknowledgement information is received.

Example 23

The method of any of examples 19 through 22, wherein the receiving the acknowledgement information on at least one beam further comprises: receiving the acknowledgement information on the at least one beam associated with at least one selected reference signal of the one or more reference signals selected by the UE.

Example 24

The method of any of examples 19 through 23, further comprising: transmitting the acknowledgement information to the PCell.

Example 25

The method of any of examples 19 through 24, further comprising: receiving an uplink reference signal of the one or more reference signals from the UE.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, and/or 4-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for a user equipment (UE) to communicate in a wireless communication network comprising a primary serving cell (PCell) and a secondary serving cell (SCell), the method comprising:
    receiving a reference signal trigger from the PCell triggering communication and processing of one or more reference signals between the UE and the SCell;
    synchronizing with the SCell based on the one or more reference signals to activate the SCell for multi-cell communication; and
    transmitting acknowledgement information acknowledging receipt of the reference signal trigger for activation of the SCell, the acknowledgement information being transmitted to the SCell on at least one beam associated with at least one of the one or more reference signals.

2. The method of claim 1, wherein the reference signal trigger identifies the one or more reference signals of a plurality of reference signals configured in the SCell.

3. The method of claim 2, wherein the receiving the reference signal trigger further comprises:
    receiving a medium access control-control element (MAC-CE) comprising the reference signal trigger.

4. The method of claim 3,
    wherein the acknowledgement information acknowledges receipt of the MAC-CE.

5. The method of claim 4, further comprising:
    selecting a serving beam pair link for communication between the SCell and the UE based on the at least one beam associated with the acknowledgement information.

6. The method of claim 1, wherein the one or more reference signals comprise at least one of a channel state information-reference signal (CSI-RS), a synchronization signal block (SSB), or a sounding reference signal (SRS).

7. The method of claim 1, further comprising:
    transmitting an uplink reference signal of the one or more reference signals to the SCell in response to receiving the reference signal trigger.

8. The method of claim 1, wherein the PCell comprises a first radio access technology (RAT) and the SCell comprises a second RAT.

9. The method of claim 1, further comprising:
    transmitting an activation message to the PCell to activate communication with the SCell for the multi-cell communication with the PCell and the SCell.

10. A scheduled entity in a wireless communication network comprising a primary serving cell (PCell) and a secondary serving cell (SCell), the scheduled entity comprising:
    a transceiver;
    a memory; and
    a processor communicatively coupled to the transceiver and the memory, wherein the processor and the memory are configured to:
        receive a reference signal trigger from the PCell triggering communication and processing of one or more reference signals between the UE and the SCell via the transceiver;
        synchronize with the SCell based on the one or more reference signals to activate the SCell for multi-cell communication; and
        transmit acknowledgement information acknowledging receipt of the reference signal trigger for activation of the SCell, the acknowledgement information being transmitted to the SCell on at least one beam associated with at least one of the one or more reference signals for selection of a serving beam pair link for communication between the SCell and the UE.

11. The scheduled entity of claim 10, wherein the reference signal trigger identifies the one or more reference signals of a plurality of reference signals configured in the SCell.

12. The scheduled entity of claim 11, wherein the processor and the memory are further configured to:
    receive a medium access control-control element (MAC-CE) comprising the reference signal trigger,
    wherein the acknowledgement information acknowledges receipt of the MAC-CE.

13. The scheduled entity of claim 12, wherein the processor and the memory are further configured to:
    select a serving beam pair link for communication between the SCell and the UE based on the at least one beam associated with the acknowledgement information.

14. The scheduled entity of claim 10, wherein the processor and the memory are further configured to:
    transmit an uplink reference signal of the one or more reference signals to the SCell in response to receiving the reference signal trigger.

15. The scheduled entity of claim 10, wherein the processor and the memory are further configured to:
    transmit an activation message to the PCell to activate communication with the SCell for the multi-cell communication with the PCell and the SCell.

16. A method for a primary serving cell (PCell) to facilitate multi-cell communication in a wireless communication network comprising the PCell and a secondary serving cell (SCell), the method comprising:
    communicating with a user equipment (UE) in the PCell;
    activating communication between the UE and the SCell for the multi-cell communication; and
    transmitting a reference signal trigger to the UE that triggers communication and processing of one or more reference signals between the UE and the SCell, the reference signal trigger further includes a respective beam identifier of each beam associated with the one or more reference signals to configure the UE to synchronize with the SCell using the one or more reference signals and to transmit acknowledgement information acknowledging receipt of the reference signal trigger on at least one beam associated with at least one of the one or more reference signals for activation of the SCell.

17. The method of claim 16, wherein the activating communication between the UE and the SCell further comprises:

receiving an activation message from the UE to activate the SCell for the multi-cell communication.

18. The method of claim 16, wherein the reference signal trigger identifies the one or more reference signals of a plurality of reference signals configured in the SCell.

19. The method of claim 18, further comprising:

selecting the one or more reference signals from the plurality of reference signals, wherein the one or more reference signals comprise a subset of the plurality of reference signals.

20. The method of claim 16, further comprising:

transmitting an indication of the one or more reference signals identified in the reference signal trigger to the SCell.

21. The method of claim 16, wherein the transmitting the reference signal trigger further comprises:

transmitting a medium access control-control element (MAC-CE) comprising the reference signal trigger.

22. The method of claim 21, further comprising:

receiving the acknowledgement information from the SCell acknowledging receipt of the MAC-CE by the UE, wherein the acknowledgement information is communicated from the UE to the SCell.

23. The method of claim 16, wherein the PCell comprises a first radio access technology (RAT) and the SCell comprises a second RAT.

* * * * *